United States Patent
Kim et al.

(10) Patent No.: US 9,732,172 B2
(45) Date of Patent: Aug. 15, 2017

(54) ETHYLENE/1-HEXENE OR ETHYLENE/1-BUTENE COPOLYMER HAVING EXCELLENT PROCESSIBILITY AND ENVIRONMETAL STRESS CRACK RESISTANCE

(71) Applicant: LG CHEM, LTD., Seoul (KR)

(72) Inventors: Joong Soo Kim, Daejeon (KR); Hyuck Ju Kwon, Daejeon (KR); Yi Young Choi, Daejeon (KR); Ki Soo Lee, Daejeon (KR); Eun Kyoung Song, Daejeon (KR); Nak-Kyu Song, Daejeon (KR); Dae Sik Hong, Daejeon (KR); Woo Ri Kim, Daejeon (KR); Si Yong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/035,099

(22) PCT Filed: Oct. 13, 2015

(86) PCT No.: PCT/KR2015/010788
§ 371 (c)(1),
(2) Date: May 6, 2016

(87) PCT Pub. No.: WO2016/060445
PCT Pub. Date: Apr. 21, 2016

(65) Prior Publication Data
US 2016/0280822 A1    Sep. 29, 2016

(30) Foreign Application Priority Data

Oct. 13, 2014  (KR) .................. 10-2014-0137867
Oct. 13, 2014  (KR) .................. 10-2014-0137868
Oct. 13, 2015  (KR) .................. 10-2015-0142491

(51) Int. Cl.
| | |
|---|---|
| *C08F 210/16* | (2006.01) |
| *C08F 4/64* | (2006.01) |
| *C08F 4/6592* | (2006.01) |
| *C08L 23/16* | (2006.01) |

(52) U.S. Cl.
CPC .............. *C08F 210/16* (2013.01); *C08F 4/64* (2013.01); *C08F 4/6592* (2013.01); *C08F 2500/04* (2013.01); *C08F 2500/05* (2013.01); *C08F 2500/12* (2013.01); *C08F 2500/13* (2013.01); *C08F 2500/18* (2013.01); *C08L 23/16* (2013.01); *C08L 2203/18* (2013.01)

(58) Field of Classification Search
CPC .................................... C08F 210/16
See application file for complete search history.

(56) References Cited

U.S. PATENT DOCUMENTS

| | | | |
|---|---|---|---|
| 4,935,474 A | 6/1990 | Ewen et al. | |
| 5,914,289 A | 6/1999 | Razavi | |
| 6,185,349 B1* | 2/2001 | Dammert | C08F 10/00 385/100 |
| 6,441,096 B1* | 8/2002 | Backman | C08L 23/0815 138/177 |
| 6,756,455 B2 | 6/2004 | Nagy et al. | |
| 6,828,394 B2 | 12/2004 | Vaughan et al. | |
| 6,841,631 B2 | 1/2005 | Loveday et al. | |
| 6,894,128 B2 | 5/2005 | Loveday et al. | |
| 7,037,977 B2* | 5/2006 | Miserque | F16L 9/12 525/191 |
| 7,529,410 B2* | 5/2009 | Wang | G06F 3/03545 345/179 |
| 7,592,410 B2* | 9/2009 | Van Marion | C08F 297/08 526/348 |
| 7,655,740 B2 | 2/2010 | Nagy et al. | |
| 7,723,451 B2 | 5/2010 | Nagy et al. | |
| 7,737,222 B2* | 6/2010 | Backman | C08F 10/02 138/121 |
| 7,781,549 B2 | 8/2010 | Nagy et al. | |
| 8,168,274 B2* | 5/2012 | Helland | C08F 10/02 428/220 |
| 8,716,414 B2 | 5/2014 | Ha et al. | |
| 8,722,807 B2* | 5/2014 | Backman | C08L 23/04 525/240 |
| 2004/0181010 A1 | 9/2004 | Miserque et al. | |

(Continued)

FOREIGN PATENT DOCUMENTS

| | | | |
|---|---|---|---|
| CN | 1906220 A | 1/2007 | |
| EP | 1 231 238 A1 * | 8/2002 | ............. C08L 23/04 |

(Continued)

OTHER PUBLICATIONS

Helmut G. Alt et al.: "Polymerization of ethylene with metallocene/methylaluminoxane catalysts supported on polysiloxane micro gels and silica", Journal of Organometallic Chemistry 568 (1998) pp. 263-269.

Walter Kaminsky: "Highly active metallocene catalysts for olefin polymerization", J. Chem. Soc., Dalton Trans., 1998, pp. 1413-1418.

*Primary Examiner* — Rip A Lee

(74) *Attorney, Agent, or Firm* — Dentons US LLP

(57) ABSTRACT

The present invention relates to an ethylene/1-hexene or ethylene/1-butene copolymer having excellent processibility. The ethylene/1-hexene or ethylene/1-butene copolymer according to the present invention has high molecular weight and wide molecular weight distribution, and thus excellent processibility, and has excellent environmental stress crack resistance, and thus, may be applied for a high inner pressure heating pipe, a mining pipe, or a large-diameter pipe, and the like.

7 Claims, 1 Drawing Sheet

(56) References Cited

U.S. PATENT DOCUMENTS

| | | | |
|---|---|---|---|
| 2005/0228139 A1 | 10/2005 | Lee et al. | |
| 2006/0079656 A1 | 4/2006 | DesLauriers et al. | |
| 2006/0183631 A1* | 8/2006 | Lee | C08F 210/16 502/117 |
| 2007/0273066 A1* | 11/2007 | Johansson | C08L 23/0807 264/454 |
| 2008/0196922 A1* | 8/2008 | Van Marion | C08F 10/02 174/110 PM |
| 2009/0252910 A1* | 10/2009 | Baeckman | C08F 210/16 428/36.92 |
| 2010/0047440 A1* | 2/2010 | Van Marion | C08F 297/08 427/117 |
| 2010/0075087 A1* | 3/2010 | Palmlof | C08L 23/02 428/36.9 |
| 2010/0121006 A1* | 5/2010 | Cho | C08F 10/00 526/90 |
| 2010/0144988 A1 | 6/2010 | Foettinger et al. | |
| 2012/0214926 A1 | 8/2012 | Berthold et al. | |
| 2015/0051364 A1* | 2/2015 | Vahteri | C08F 210/16 526/348.6 |

FOREIGN PATENT DOCUMENTS

| | | | |
|---|---|---|---|
| EP | 2367863 B1 | 10/2012 | |
| EP | 2 746 334 A1 * | 6/2014 | C08L 23/06 |
| EP | 3012261 A1 | 4/2016 | |
| EP | 3012262 A1 | 4/2016 | |
| EP | 3070108 A1 | 9/2016 | |
| EP | 3168243 A1 | 5/2017 | |
| JP | 2002-504958 A | 2/2002 | |
| JP | 3968449 B2 | 6/2007 | |
| JP | 2007-218324 * | 8/2007 | F16L 11/04 |
| JP | 2011-144157 A | 7/2011 | |
| JP | 2012-214764 A | 11/2012 | |
| JP | 5584472 B2 | 7/2014 | |
| KR | 10-2000-0069979 A | 11/2000 | |
| KR | 10-2004-0037067 A | 5/2004 | |
| KR | 10-2004-0076965 A | 9/2004 | |
| KR | 10-2005-0024287 A | 3/2005 | |
| KR | 10-2006-0087890 A | 8/2006 | |
| KR | 10-0646249 B1 | 11/2006 | |
| KR | 10-2007-0117565 A | 12/2007 | |
| KR | 20080097949 A | 11/2008 | |
| KR | 10-2010-0121449 A | 11/2010 | |
| KR | 10-2011-0015737 A | 2/2011 | |
| KR | 10-2012-0029162 A | 3/2012 | |
| KR | 10-1154507 B1 | 6/2012 | |
| KR | 10-2013-0033362 A | 4/2013 | |
| KR | 10-1288228 B1 | 7/2013 | |
| KR | 10-2014-0071142 A | 6/2014 | |
| KR | 10-2014-0120358 A | 10/2014 | |
| WO | 2013/113797 A1 | 8/2013 | |
| WO | 2015-162212 A1 | 10/2015 | |
| WO | 2016/036204 A1 | 3/2016 | |

* cited by examiner

[Figure 1]
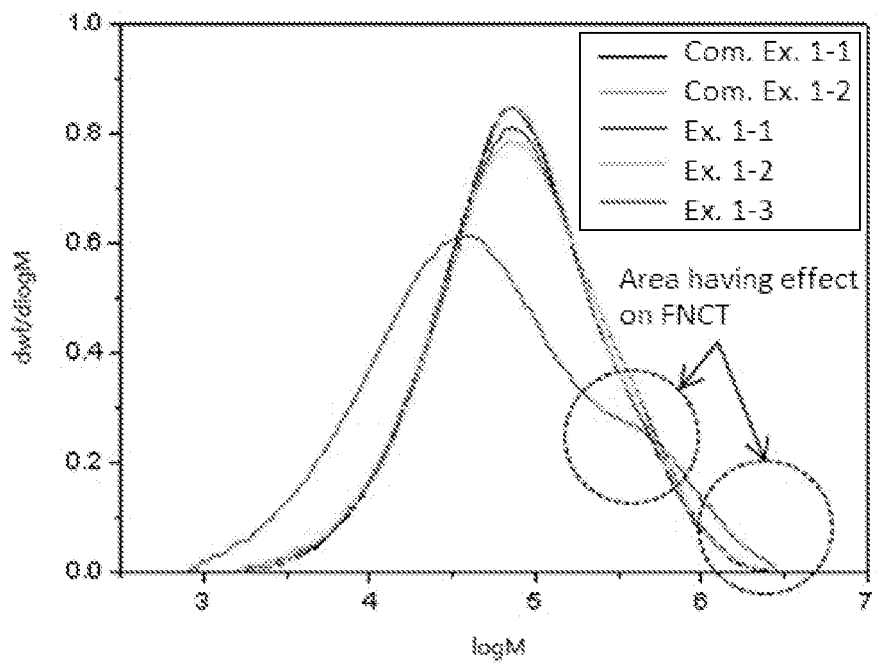
[Figure 2]
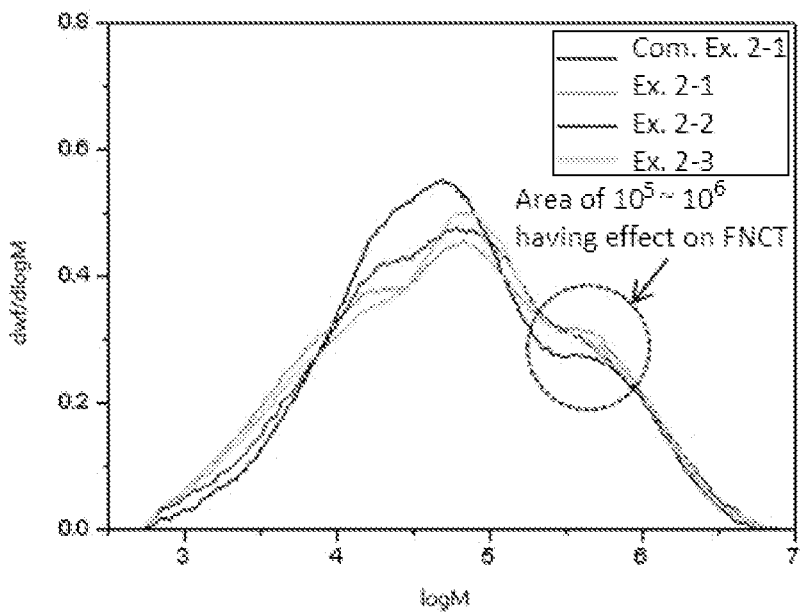

ETHYLENE/1-HEXENE OR ETHYLENE/1-BUTENE COPOLYMER HAVING EXCELLENT PROCESSIBILITY AND ENVIRONMETAL STRESS CRACK RESISTANCE

CROSS-REFERENCE TO RELATED APPLICATION(S)

This application is a National Stage Entry of International Application No. PCT/KR2015/010788, filed on Oct. 13, 2015, and claims the benefit of and priority to Korean Patent Application No. 10-2014-0137867, filed on Oct. 13, 2014, Korean Patent Application No. 10-2014-0137868, filed on Oct. 13, 2014, and Korean Patent Application No.10-2015-0142491, filed on Oct. 13, 2015, all of which are incorporated herein by reference in their entirety for all purposes as if fully set forth herein.

TECHNICAL FIELD

The present invention relates to an ethylene/1-hexene or ethylene/1-butene copolymer having excellent processibility and environmental stress crack resistance.

BACKGROUND OF ART

Olefin polymerization catalyst system is classified into Zeigler-Natta and metallocene catalyst systems, and these high activity catalyst systems have been developed according to each characteristic. Although a Zeigler-Natta catalyst has been widely applied for the existing commercial processes since it was invented in 1950's, since it is a multi site catalyst having a plurality of active sites, the molecular weight distribution of the prepared polymer is wide, and the composition distribution of comonomers is not uniform, and thus, it has a limitation in securing desired properties.

Meanwhile, a metallocene catalyst consists of a main catalyst including a transition metal compound as a main component and a cocatalyst of an organic metal compound including aluminum as a main component, and such a catalyst is a homogeneous complex catalyst and a single site catalyst, and thus, a polymer having narrow molecular weight distribution and uniform composition distribution of comonomers is obtained due to the properties of a single site, and the stereoregularity, copolymerization properties, molecular weight, crystallization degree and the like may be changed by modifying the ligand structure of the catalyst and changing polymerization conditions.

U.S. Pat. No. 5,914,289 describes a method of controlling the molecular weight and the molecular weight distribution of polymer using a metallocene catalyst supported in each carrier, however, a large amount of the catalyst is used for preparing the supported catalyst and the preparation takes long time, and the metallocene catalyst used should be respectively supported in a carrier, which is cumbersome.

Korean Patent Application No. 2003-12308 discloses a method of controlling molecular weight distribution by supporting a dinuclear metallocene catalyst and a mononuclear metallocene catalyst in a carrier together with an activator and polymerizing while changing the combination of the catalysts in a reactor. However, this method has a limit in simultaneous realization of the properties of each catalyst, and has a disadvantage in that metallocene catalyst parts are separated in the carrier component of the finished catalyst to induce fouling of a reactor.

Thus, in order to solve the above disadvantages, there is a continued demand for a method for preparing olefin polymer having desired properties by conveniently preparing a hybrid supported metallocene catalyst having excellent activity.

Meanwhile, linear low density polyethylene is prepared by copolymerizing ethylene and alpha olefin at low pressure using a polymerization catalyst, and has narrow molecular weight distribution and short chain branches of a specific length without long chain branches. A linear low density polyethylene film has high breaking strength and elongation, excellent tear strength, falling weight impact strength and the like, together with general properties of polyethylene, and thus, the use is increasing in a stretch film, an overlap film and the like, to which the existing low density polyethylene or high density polyethylene are difficult to apply.

However, most linear low density polyethylenes using 1-butene or 1-hexene as comonomers are prepared in a single gas phase reactor or a single loop slurry reactor, and although the productivity is higher compared to the process using 1-octene comonomers, the properties of such products are significantly inferior to those using 1-octene comonomer due to the limitations of catalyst technology and process technology, and the molecular weight distribution is narrow and processibility is poor. There have been many efforts to improve these problems.

U.S. Pat. No. 4,935,474 describes a method of preparing polyethylene having wide molecular weight distribution using two or more kinds of metallocene compounds. U.S. Pat. No. 6,828,394 discloses a method of preparing polyethylene having excellent processibility and particularly suitable for a film, using compounds having good comonomer bonding property and compounds lacking in comonomer bonding property in a mixture. Further, U.S. Pat. Nos. 6,841,631, and 6,894,128 state that polyethylene having bimodal or multi-modal molecular weight distribution is prepared with a metallocene catalyst using at least two kinds of metal compounds, and it can be applied for film, blow molding, a pipe and the like. However, although the processibility of these products are improved, distribution state according to molecular weight is not uniform in the unit particle, and the extrusion appearance is rough and the properties are not stable even under relatively good extrusion conditions.

Under these circumstances, there is a continued demand for the preparation of more excellent products balanced between properties and processibility, and particularly, improvement in environmental stress crack resistance is further required.

DETAILED DESCRIPTION OF THE INVENTION

Technical Problem

In order to overcome the problems of the prior art, it is an object of the present invention to provide an ethylene/1-hexene or ethylene/1-butene copolymer having excellent processibility and environmental stress crack resistance.

Technical Solution

In order to achieve the object, the present invention provides an ethylene/1-hexene or ethylene/1-butene copolymer satisfying the following requirements:

An ethylene/1-hexene or ethylene/1-butene copolymer having weight average molecular weight (g/mol) of 10,000 to 400,000, molecular weight distribution (Mw/Mn, PDI) of 2 to 30, and environmental stress crack resistance (ESCR) of 400 hours to 20,000 hours, as measured by full notch creep test (FNCT) according to ISO 16770 at 4.0 MPa and 80° C.

Hereinafter, the present invention will be explained in detail.

Ethylene/1-hexene copolymer

Preferably, the ethylene/1-hexene copolymer according to the present invention has a density (g/cm$^3$) of 0.930 to 0.950, MFR$_{2.16}$ (g/10 min, measured at 190° C. by ASTM 1238) of 0.1 to 5, and melt flow rate ratio (MFR$_{21.6}$/MFR$_{2.16}$, measured at 190° C. by ASTM 1238) of 10 to 200.

Further, preferably, the weight average molecular weight (Mw, g/mol) of the ethylene/1-hexene copolymer is 10,000 to 400,000. More preferably, the weight average molecular weight is not less than 50,000, not less than 60,000, not less than 70,000, not less than 80,000, not less than 90,000, not less than 100,000, not less than 110,000, or not less than 120,000, and not more than 350,000, not more than 300,000, not more than 250,000, not more than 200,000, or not more than 150,000.

Further, preferably, the molecular weight distribution (Mw/Mn, PDI) of the ethylene/1-hexene copolymer is 2 to 30. Due to the wide molecular weight distribution, the ethylene/1-hexene copolymer may exhibit excellent processibility. More preferably, the molecular weight distribution is not less than 3, and not more than 25, not more than 20, not more than 15, not more than 14, not more than 13, not more than 12, not more than 11, or not more than 10.

The ethylene/1-hexene copolymer of the present invention has high molecular weight and wide molecular weight distribution, and has excellent properties and processibility.

Further, the ethylene/1-hexene copolymer of the present invention has wider molecular weight distribution and melt flow rate ratio (MFRR) compared to the existing ethylene/1-hexene copolymer, and thus, has remarkably improved flowability and may exhibit more excellent processibility.

Preferably, the ethylene/1-hexene copolymer has melt flow rat ratio (MFRR, MFR$_{21.6}$/MFR$_{2.16}$) of 10 to 200. By having melt flow rate ratio of the above range, flowability may be appropriately controlled under each load, thus simultaneously improving processibility and mechanical properties. More preferably, the melt flow rate ratio is not less than 15, not less than 20, not less than 25, or not less than 30, and not more than 190, not more than 180, not more than 170, not more than 160, not more than 150, not more than 140, not more than 130, or not more than 120.

Further, preferably, the MFR$_{2.16}$ (melt flow index measured at 190° C. under 2.16 kg load according to ASTM D1238) of the ethylene/1-hexene copolymer is 0.1 to 5 g/10 min, more preferably 0.1 to 3 g/10 min.

Further, preferably, the density of the ethylene/1-hexene copolymer is 0.930 to 0.950 g/cm$^3$, preferably 0.935 to 0.950 g/cm$^3$.

Further, preferably, the ethylene/1-hexene copolymer has environmental stress crack resistance (ESCR), measured by full notch creep test (FNCT) at 4.0 MPa and 80° C. according to ISO 16770, of 400 hours to 20,000 hours. More preferably, the environmental stress crack resistance is not less than 600 hours, not less than 800 hours, not less than 1,000 hours, not less than 1,200 hours, not less than 1,400 hours, not less than 1,600 hours, not less than 1,800 hours, or not less than 2,000 hours. Further, as the value of the environmental stress crack resistance is large, properties is more excellent, and thus, the upper limit is not substantially limited, but for example, it may be not more than 8,760 hours, not more than 8,000 hours, not more than 7,000 hours, not more than 6,000 hours, not more than 5,000 hours, not more than 4,000 hours, or not more than 3,000 hours.

In the ethylene/1-hexene copolymer, the content of the 1-hexene comonomers may be about 0.5 to about 10 wt %, preferably about 1 to about 5 wt %, but is not limited thereto.

Ethylene/1-butene copolymer

Preferably, the ethylene/1-butene copolymer according to the present invention has a density (g/cm$^3$) of 0.930 to 0.950, MFR$_5$ (g/10 min, measured at 190° C. by ASTM 1238) of 0.1 to 5, and melt flow rate ratio (MFR$_{21.6}$/MFR$_5$, measured at 190° C. by ASTM 1238) of 10 to 200.

Further, preferably, the weight average molecular weight (Mw, g/mol) of the ethylene/1-butene copolymer is 10,000 to 400,000. More preferably, the weight average molecular weight is not less than 50,000, not less than 100,000, not less than 150,000, not less than 200,000, not less than 210,000, not less than 220,000, or not less than 230,000, and not more than 350,000, not more than 300,000, not more than 290,000, not more than 280,000, not more than 270,000, not more than 260,000, or not more than 250,000.

Further, preferably, the molecular weight distribution (Mw/Mn, PDI) of the ethylene/1-butene copolymer is 2 to 30. Due to the wide molecular weight distribution, the ethylene/1-butene copolymer may exhibit excellent processibility. More preferably, the molecular weight distribution is not less than 5, not less than 7, not less than 10, not less than 15, not less than 16, not less than 17, not less than 18, or not less than 19, and not more than 28, not more than 27, not more than 26, not more than 25, not more than 24, not more than 23, or not more than 12.

The ethylene/1-butene copolymer of the present invention has high molecular weight and wide molecular weight distribution, and has excellent properties and processibility.

Further, the ethylene/1-butene copolymer of the present invention has wider molecular weight distribution and melt flow rate ratio (MFRR) compared to the existing ethylene/1-butene copolymer, and thus, has remarkably improved flowability and may exhibit more excellent processibility.

Preferably, the ethylene/1-butene copolymer has melt flow rat ratio (MFRR, MFR$_{21.6}$/MFR$_5$) of 10 to 200. By having melt flow rate ratio of the above range, flowability may be appropriately controlled under each load, thus simultaneously improving processibility and mechanical properties. More preferably, the melt flow rate ratio is not less than 15, not less than 20, not less than 25, or not less than 30, and not more than 180, not more than 150, not more than 100, not more than 50, not more than 40, not more than 35, not more than 34, or not more than 33.

Further, preferably, the MFR$_5$ (melt flow index measured at 190° C. under 5 kg load according to ASTM D1238) of the ethylene/1-butene copolymer is 0.1 to 5 g/10 min, more preferably 0.1 to 3 g/10 min.

Further, preferably, the density of the ethylene/1-butene copolymer is 0.930 to 0.950 g/cm$^3$, preferably 0.935 to 0.950 g/cm$^3$.

Further, preferably, the ethylene/1-butene copolymer has environmental stress crack resistance (ESCR), measured by full notch creep test (FNCT) at 4.0 MPa and 80° C. according to ISO 16770, of 400 hours to 20,000 hours. More preferably, the environmental stress crack resistance is not less than 600 hours, not less than 800 hours, not less than 1,000 hours, not less than 1,200 hours, not less than 1,400 hours, not less than 1,600 hours, not less than 1,800 hours, or not less than 2,000 hours. Further, as the value of the environmental stress crack resistance is large, properties is more excellent, and thus, the upper limit is not substantially limited, but for example, it may be not more than 8,760 hours, not more than 8,000 hours, not more than 7,000 hours, not more than 6,000 hours, not more than 5,000 hours, not more than 4,000 hours, or not more than 3,000 hours.

In the ethylene/1-butene copolymer, the content of the 1-butene comonomers may be about 0.5 to about 10 wt %, preferably about 1 to about 5 wt %, but is not limited thereto.

A Catalyst for the Preparation of a Copolymer

The ethylene/1-hexene or ethylene/1-butene copolymer may be prepared using a metallocene catalyst. The metallocene catalyst that can be used may be a mixture of at least one first metallocene compound represented by the following Chemical Formula 1; and at least one second metallocene compound selected from the compounds represented by the following Chemical Formulae 3 to 5.

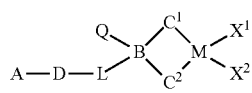

[Chemical Formula 1]

in the Chemical Formula 1,

A is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{3-20}$ heterocycloalkyl, or $C_{5-20}$ heteroaryl;

D is —O—, —S—, —N(R)— or —Si(R)(R')—, wherein R and R' are identical to or different from each other, and are each independently hydrogen, halogen, $C_{1-20}$ alkyl, $C_{2-20}$ alkenyl, or $C_{6-20}$ aryl;

L is $C_{1-10}$ linear or branched alkylene;

B is carbon, silicon or germanium;

Q is hydrogen, halogen, $C_{1-20}$ alkyl, $C_{2-20}$ alkenyl, $C_{6-20}$ aryl, $C_{7-20}$ alkylaryl, or $C_{7-20}$ arylalkyl;

M is Group 4 transition metal;

$X^1$ and $X^2$ are identical to or different from each other, and are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

$C^1$ and $C^2$ are identical to or different from each other, and are each independently represented by one of the following Chemical Formula 2a, Chemical Formula 2b or Chemical Formula 2c, provided that both $C^1$ and $C^2$ are not Chemical Formula 2c;

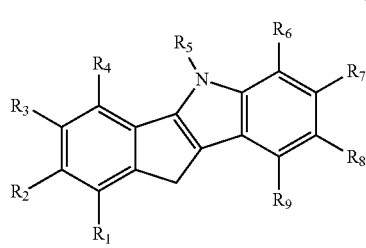

[Chemical Formula 2a]

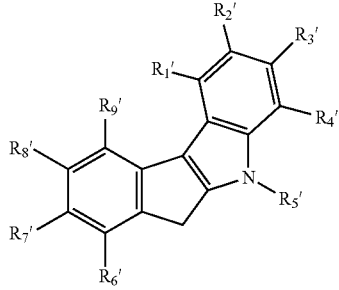

[Chemical Formula 2b]

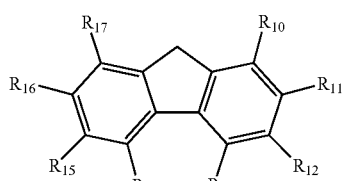

[Chemical Formula 2c]

in the Chemical Formulae 2a, 2b and 2c, $R_1$ to $R_{17}$ and $R_1'$ to $R_9'$ are identical to or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-20}$ alkylaryl, or $C_{7-20}$ arylalkyl, and two or more neighboring groups of $R_{10}$ to $R_{17}$ may be connected to each other to form a substituted or unsubstituted aliphatic or aromatic ring;

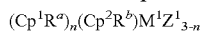 [Chemical Formula 3]

in the Chemical Formula 3, $M^1$ is Group 4 transition metal;

$Cp^1$ and $Cp^2$ are identical to or different from each other, and are each independently one selected from the group consisting of cyclopentadienyl, indenyl, 4,5,6,7-tetrahydro-1-indenyl, and fluorenyl radicals, which may be substituted with hydrocarbon having a carbon number of 1 to 20;

$R^a$ and $R^b$ are identical to or different from each other, and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^1$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, or substituted or unsubstituted amino, $C_{2-20}$ alkylalkoxy, or $C_{7-40}$ arylalkoxy;

n is 1 or 0;

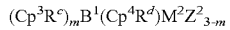 [Chemical Formula 4]

in the Chemical Formula 4, $M^2$ is Group 4 transition metal;

$Cp^3$ and $Cp^4$ are identical to or different from each other, and are each independently one selected from the group consisting of cyclopentadienyl, indenyl, 4,5,6,7-tetrahydro-1-indenyl and fluorenyl radicals, which may be substituted with hydrocarbon having a carbon number of 1 to 20;

$R^c$ and $R^d$ are identical to or different from each other, and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^2$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, or substituted or unsubstituted amino, $C_{2-20}$ alkylalkoxy, or $C_{7-40}$ arylalkoxy;

$B^1$ is one or more of carbon, germanium, silicon, phosphorus or nitrogen-containing radicals, or a combination thereof, which crosslinks a $Cp^3R^c$ ring with a $Cp^4R^d$ ring, or crosslinks one $Cp^4R^d$ ring to $M^2$;

m is 1 or 0;

$$(Cp^5R^e)B^2(J)M^3Z^3{}_2 \quad \text{[Chemical Formula 5]}$$

in the Chemical Formula 5, $M^3$ is Group 4 transition metal;

$Cp^5$ is one selected from the group consisting of cyclopentadienyl, indenyl, 4,5,6,7-tetrahydro-1-indenyl and fluorenyl radicals, which may be substituted with hydrocarbon having a carbon number of 1 to 20;

$R^e$ is hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^3$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^2$ is one or more of carbon, germanium, silicon, phosphorus or nitrogen-containing radicals or a combination thereof, which crosslinks a $Cp^5R^e$ ring with J; and J is one selected from the group consisting of $NR^f$, O, $PR^f$ and S, wherein $R^f$ is $C_{1-20}$ alkyl, aryl, substituted alkyl, or substituted aryl.

Hereinafter, the substituents of the Chemical Formulae 1, 3, 4 and 5 are explained in detail.

The $C_{1-20}$ alkyl may include linear or branched alkyl, specifically, methyl, ethyl, propyl, isopropyl, n-butyl, tert-butyl, pentyl, hexyl, heptyl, octyl and the like, but is not limiter thereto.

The $C_{2-20}$ alkenyl may include linear or branched alkenyl, and specifically, allyl, ethenyl, propenyl, butenyl, pentenyl and the like, but is not limiter thereto.

The $C_{6-20}$ aryl may include monocyclic or condensed cyclic aryl, and specifically, phenyl, biphenyl, naphthyl, phenanthrenyl, fluorenyl and the like, but is not limited thereto.

The $C_{5-20}$ heteroaryl may include monocyclic or condensed cyclic heteroaryl, and specifically, carbozolyl, pyridyl, quinoline, isoquinoline, thiophenyl, furanyl, imidazole, oxazolyl, thiazolyl, triazine, tetrahydropyranyl, tetrahydrofuranyl and the like, but is not limited thereto.

The $C_{1-20}$ alkoxy may include methoxy, ethoxy, phenyloxy, cyclohexyloxy, and the like, but is not limited thereto.

The Group 4 transition metal may include titanium, zirconium hafnium and the like, but is not limited thereto.

It is more preferable that $R_1$ to $R_{17}$ and $R_1'$ to $R_9'$ of the Chemical Formulae 2a, 2b and 2c are each independently hydrogen, methyl, ethyl, propyl, isopropyl, n-butyl, tert-butyl, pentyl, hexyl, heptyl, octyl, phenyl, halogen, trimethylsilyl, triethylsilyl, tripropylsilyl, tributylsilyl, triisopropylsilyl, trimethylsilylmethyl, methoxy, or ethoxy, but are not limited thereto.

It more preferable that L of the Chemical Formula 1 is $C_{4-8}$ linear or branched alkylene, but is not limited thereto. Further, the alkylene group may be unsubstituted or substituted with $C_{1-20}$ alkyl, $C_{2-20}$ alkenyl, or $C_{6-20}$ aryl.

Further, it is preferable that A of the Chemical Formula 1 is hydrogen, methyl, ethyl, propyl, isopropyl, n-butyl, tert-butyl, methoxymethyl, tert-butoxymethyl, 1-ethoxyethyl, 1-methyl-1-methoxyethyl, tetrahydropyranyl, or tetrahydrofuranyl, but is not limited thereto.

Further, it is preferable that B of the Chemical Formula 1 is silicon, but is not limited thereto.

The first metallocene compound of the Chemical Formula 1 forms a structure wherein an indeno indole derivative and/or a fluorene derivative are crosslinked by a bridge, and has a lone electron pair capable of acting as Lewis acid in the ligand structure, and thus, is supported on the Lewis acidic surface of a carrier, thus exhibiting high polymerization activity even when supported.

Further, as it includes electron-rich indeno indole group and/or fluorenyl group, it has high activity, and due to appropriate steric hindrance and the electronic effect of the ligand, it has low hydrogen reactivity, and maintains high activity even when hydrogen exists. Further, as the nitrogen atom of the indeno indole derivative stabilizes beta-hydrogen of growing polymer chain by hydrogen bond, beta-hydrogen elimination may be inhibited, and thus, ultra high molecular weight olefin polymer may be polymerized. According to one embodiment of the invention, specific examples of the compound represented by the Chemical Formula 2a may include compounds represented by the following structural formulae, but are not limited thereto.

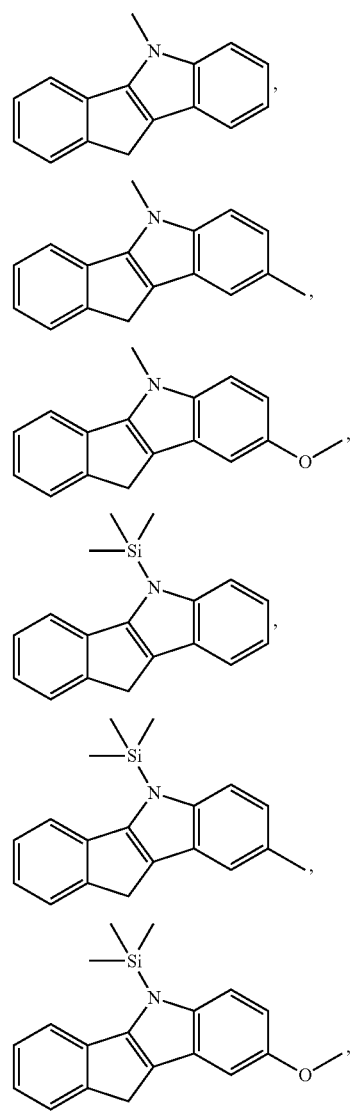

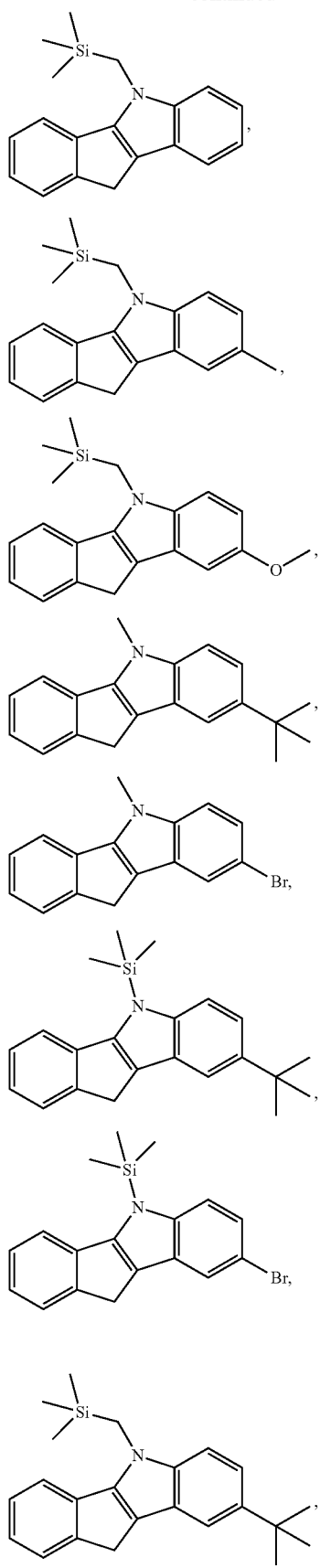
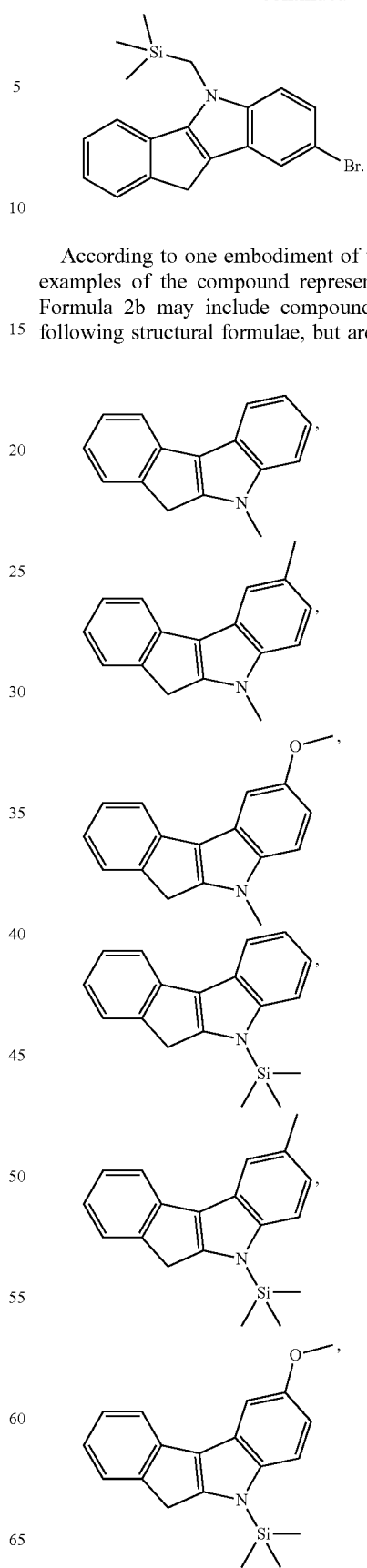
According to one embodiment of the invention, specific examples of the compound represented by the Chemical Formula 2b may include compounds represented by the following structural formulae, but are not limited thereto.

-continued
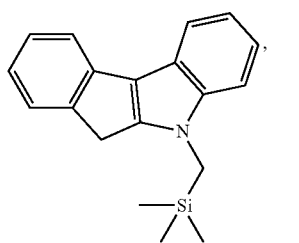
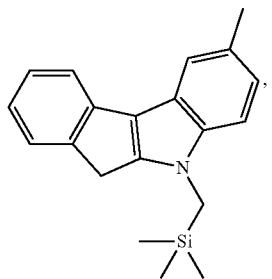
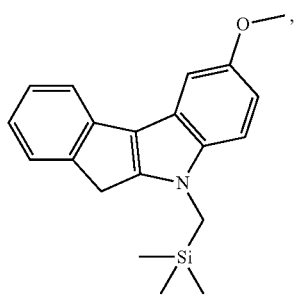
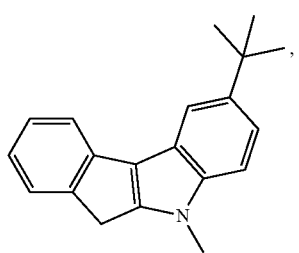
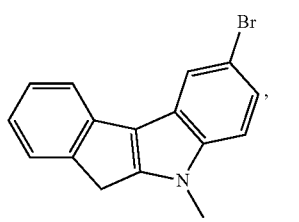
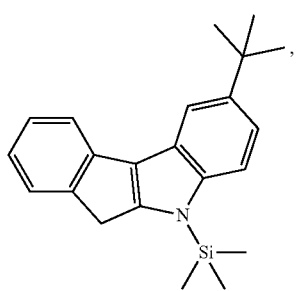
-continued
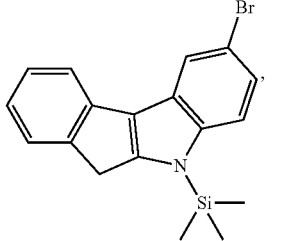
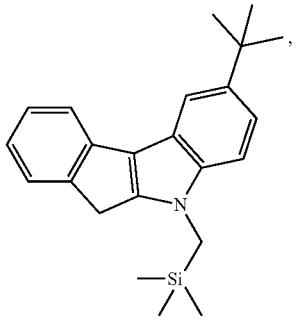
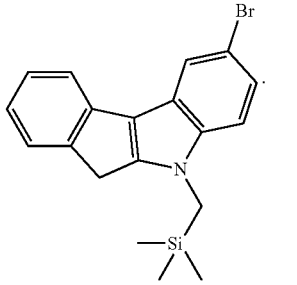
According to one embodiment of the invention, specific examples of the compound represented by the Chemical Formula 2c may include compounds represented by the following structural formulae, but are not limited thereto.
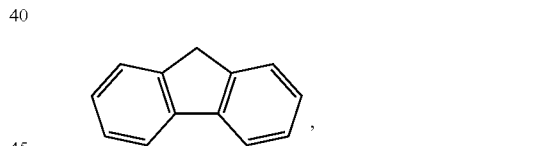
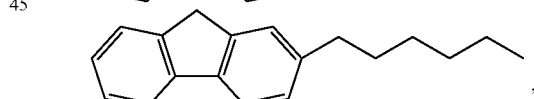
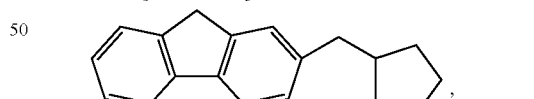
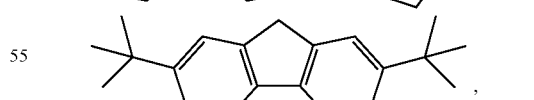
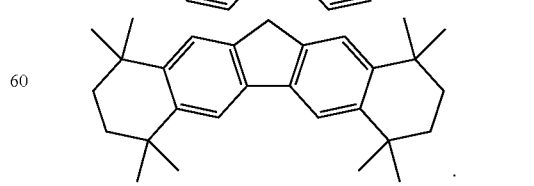
According to one embodiment of the invention, specific examples of the first metallocene compound represented by the Chemical Formula 1 may include compounds represented by the following structural formulae, but are not limited thereto.
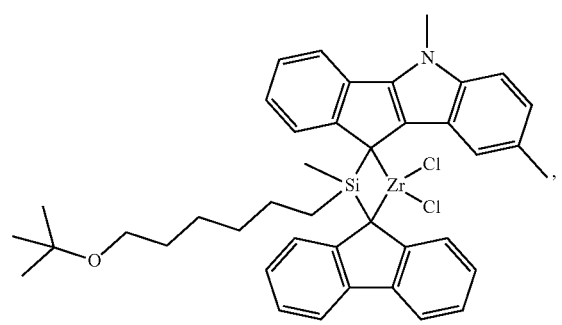
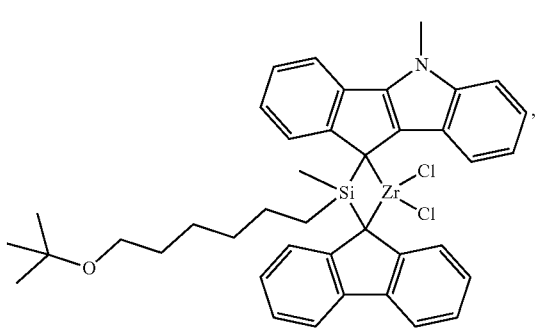
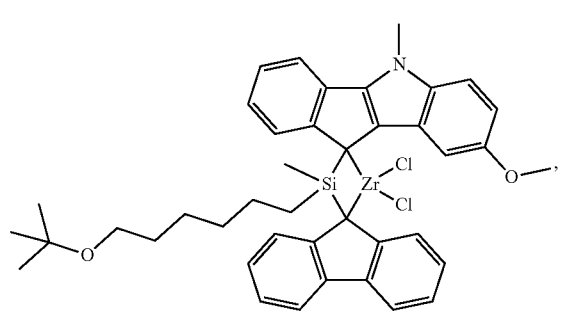
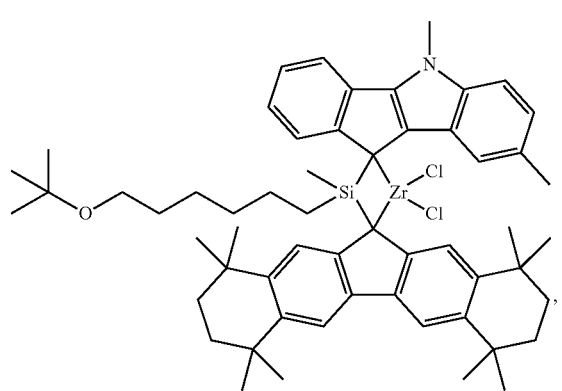
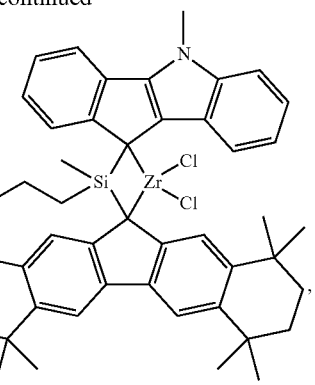
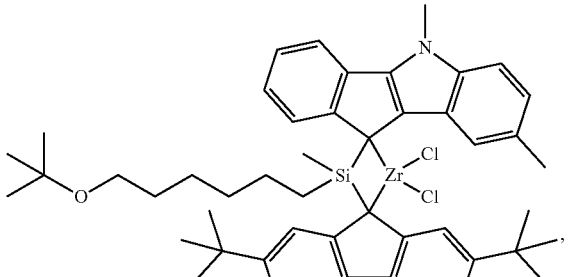
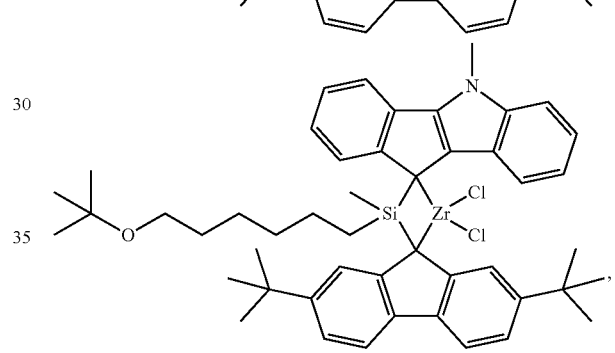
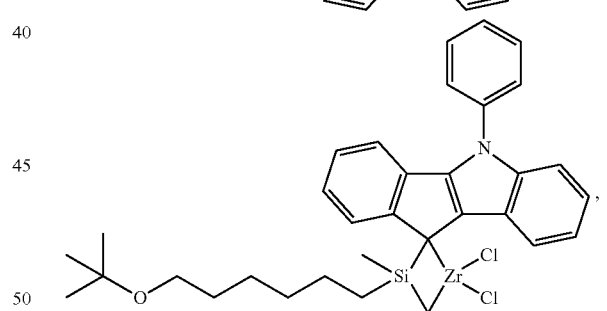
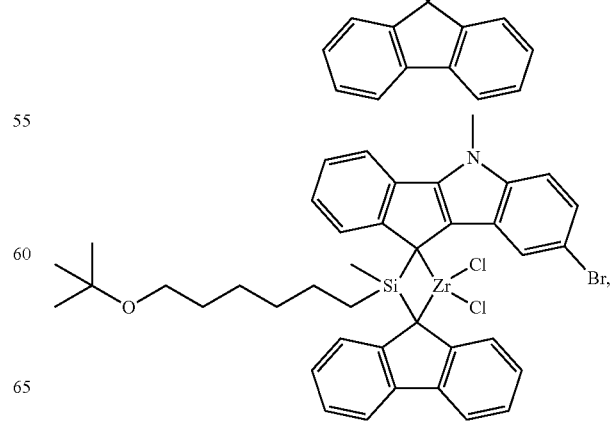

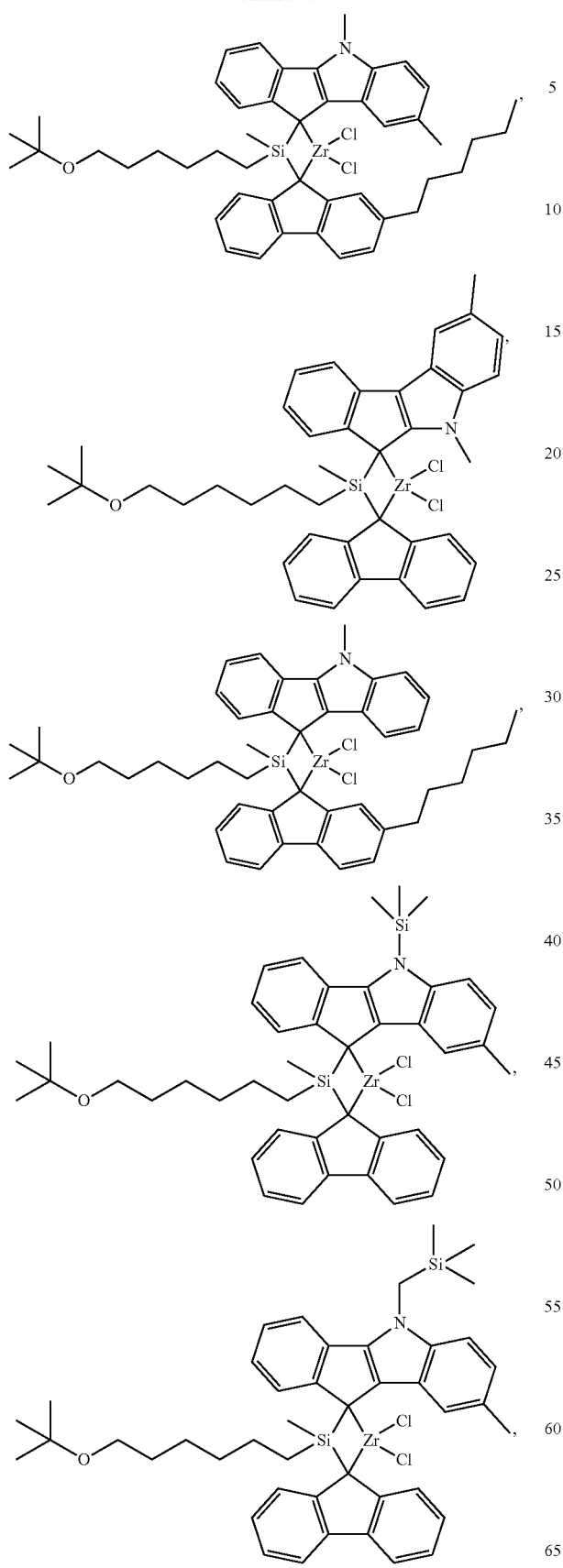
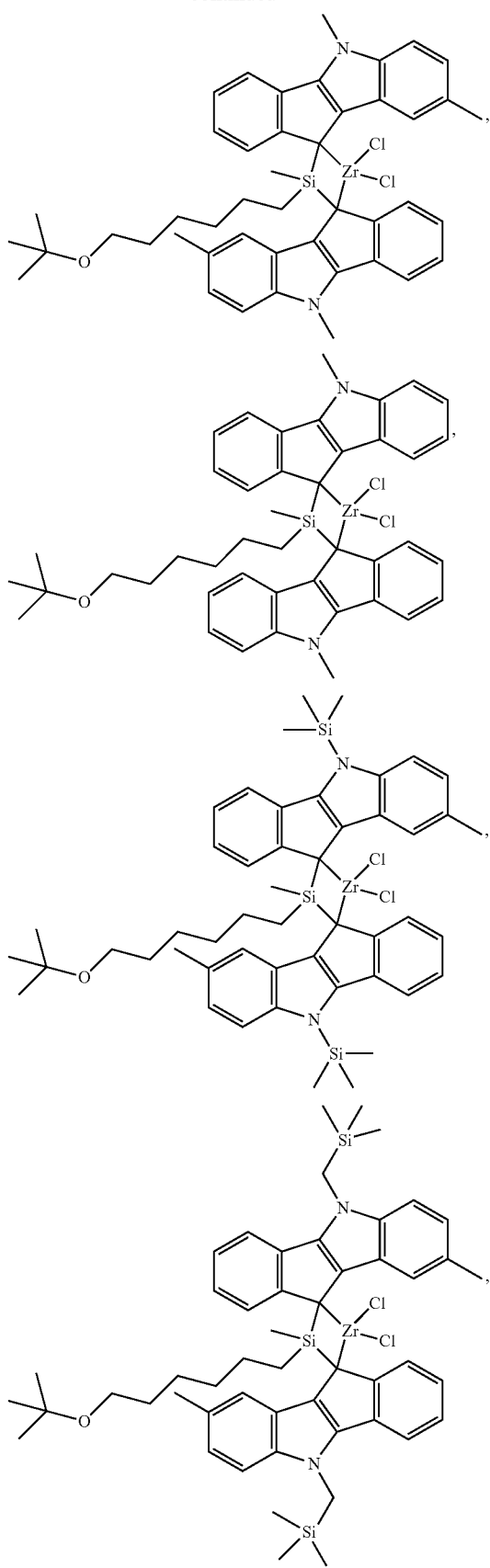

-continued

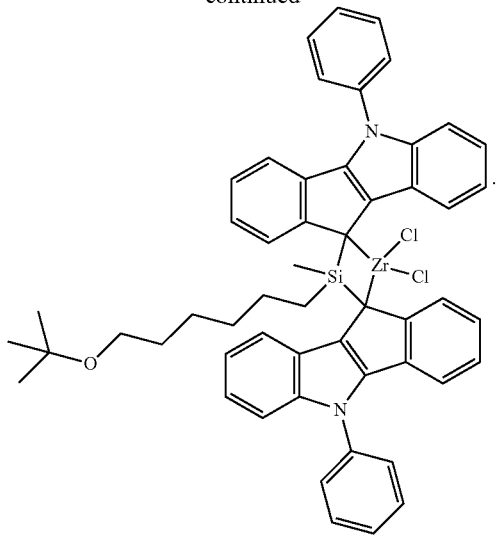

The first metallocene compound of the Chemical Formula 1 has excellent activity and can polymerize high molecular weight ethylene/1-hexene or ethylene/1-butene copolymer. Particularly, since it exhibits high polymerization activity even when supported in a carrier, it enables preparation of ultra high molecular weight ethylene/1-hexene or ethylene/1-butene copolymer.

Further, even in case a polymerization reaction is progressed with hydrogen so as to prepare ethylene/1-hexene or ethylene/1-butene copolymer having high molecular weight and simultaneously wide molecular weight distribution, the first metallocene compound of the Chemical Formula 1 of the present invention exhibits low hydrogen reactivity, and thus, ultra high molecular weight ethylene/1-hexene or ethylene/1-butene copolymer may be polymerized with still high activity. Thus, even if used in a mixture with catalysts having other properties, ethylene/1-hexene or ethylene/1-butene copolymer satisfying high molecular weight properties may be prepared without lowering of activity, and thus, ethylene/1-hexene or ethylene/1-butene copolymer including high molecular weight ethylene/1-hexene or ethylene/1-butene copolymer and yet having wide molecular weight distribution may be easily prepared.

The first metallocene compound of the Chemical Formula 1 may be obtained by connecting an indenoindole derivative and/or a fluorene derivative by a bridge compound to prepare a ligand compound, and then, introducing a metal precursor compound to conduct metallation. The preparation method of the first metallocene compound will be concretely explained in examples described below.

The compound represented by the Chemical Formula 3 may be, for example, a compound represented by one of the following structural formulae, but is not limited thereto.

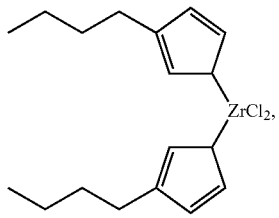

-continued

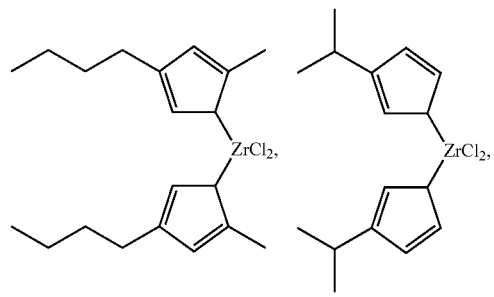

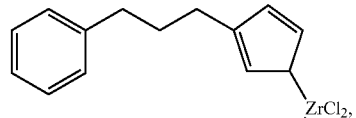

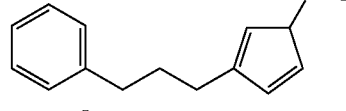

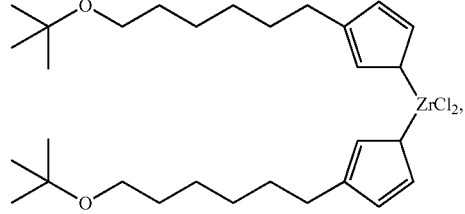

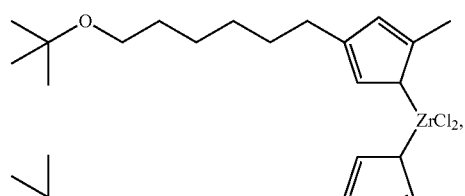

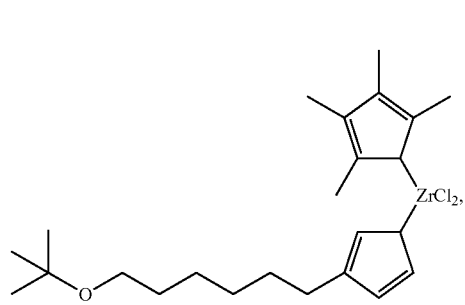

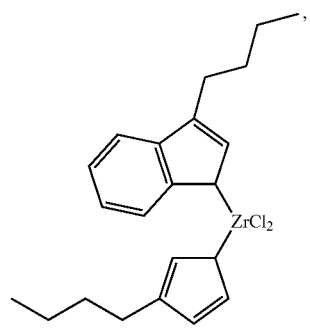

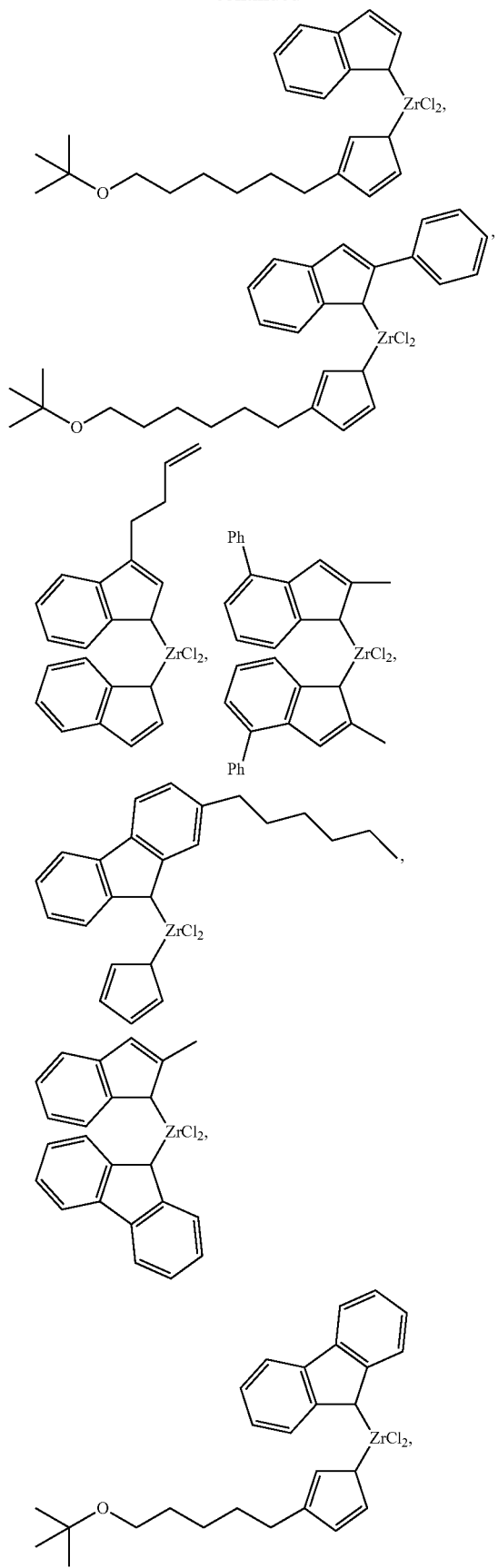

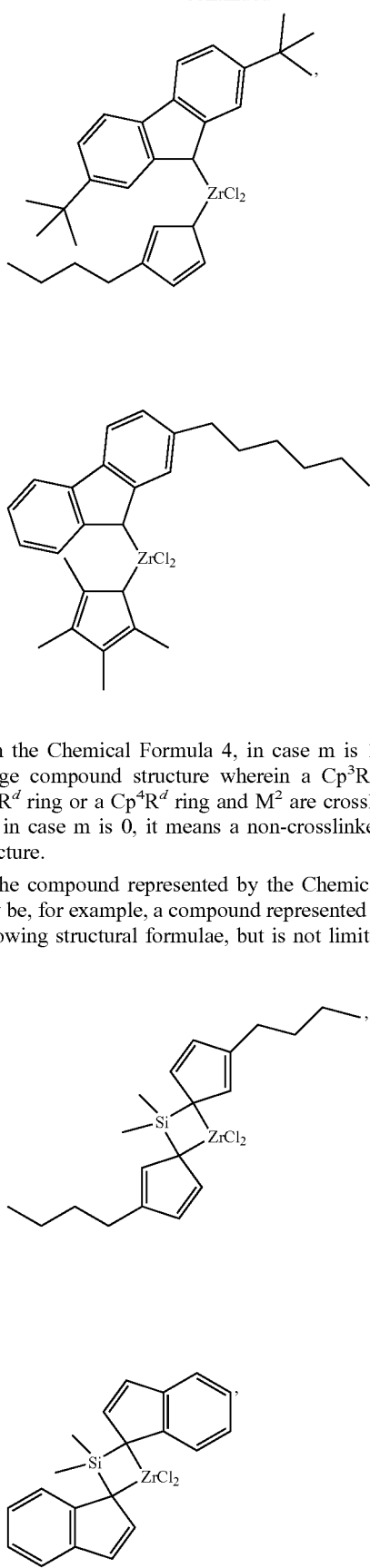

In the Chemical Formula 4, in case m is 1, it means a bridge compound structure wherein a $Cp^3R^c$ ring and a $Cp^4R^d$ ring or a $Cp^4R^d$ ring and $M^2$ are crosslinked by $B^1$, and in case m is 0, it means a non-crosslinked compound structure.

The compound represented by the Chemical Formula 4 may be, for example, a compound represented by one of the following structural formulae, but is not limited thereto.

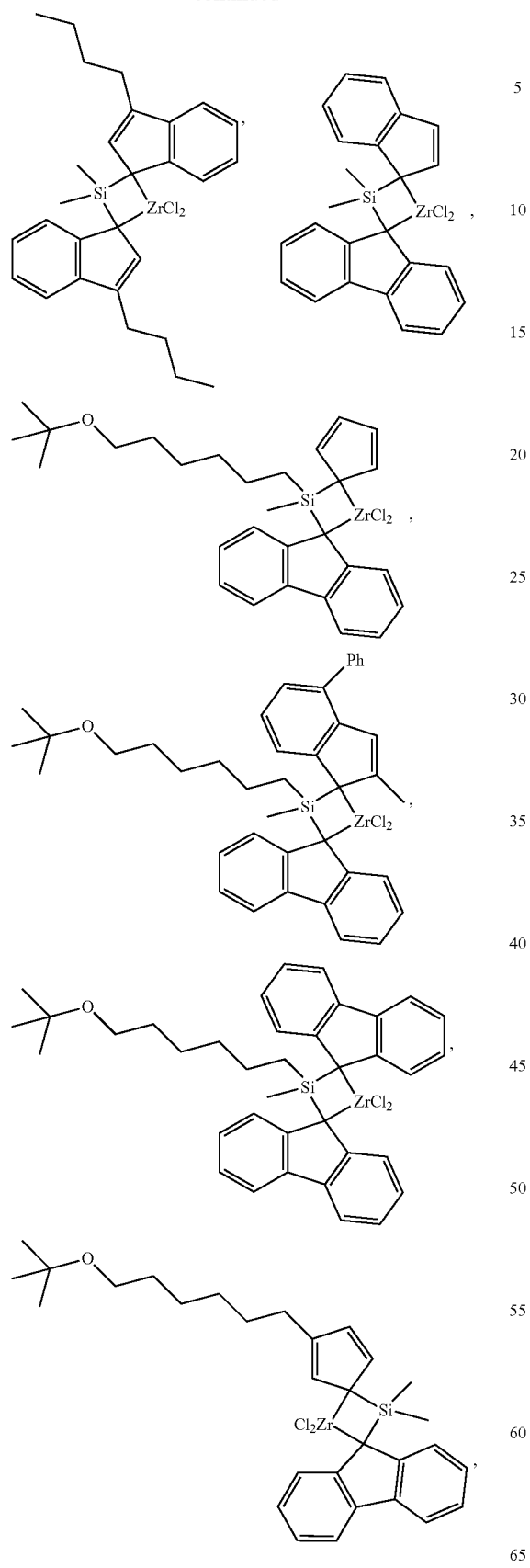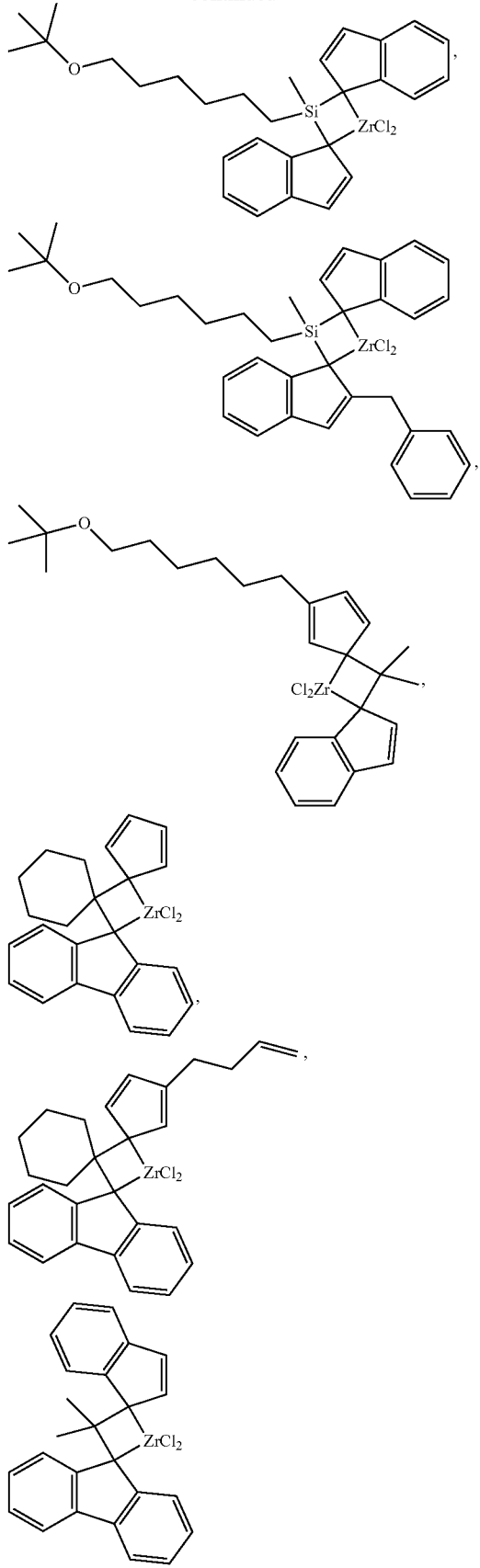

The compound represented by the Chemical Formula 5 may be, for example, a compound represented by one of the following structural formulae, but is not limited thereto.

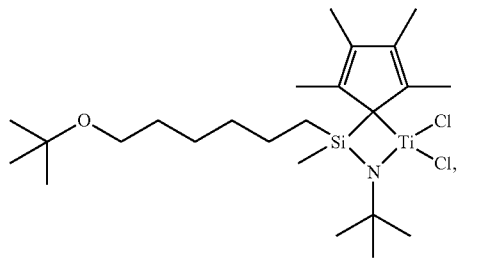

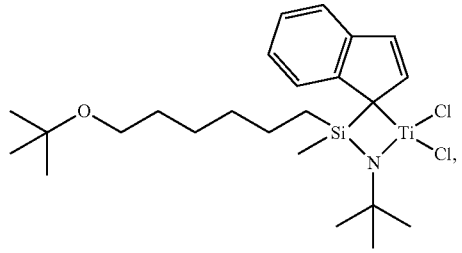

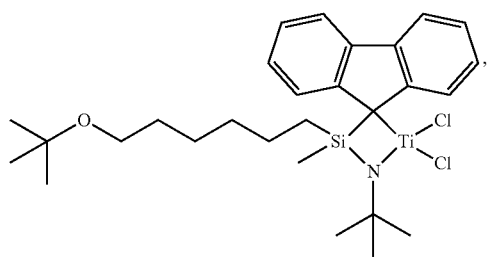

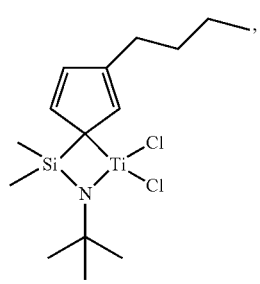

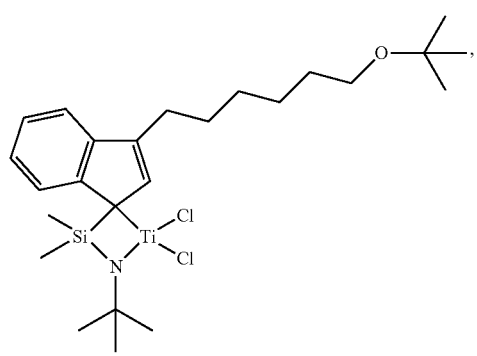

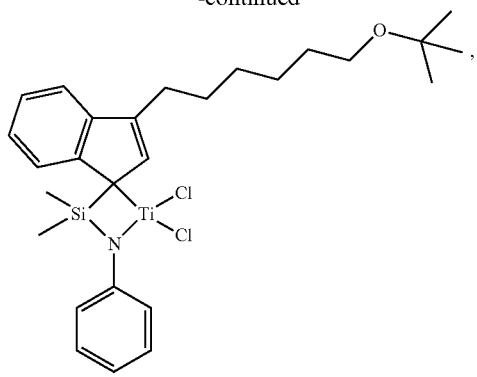

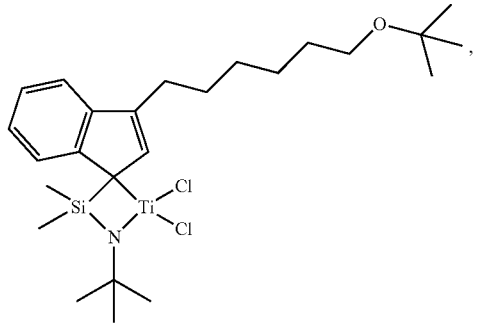

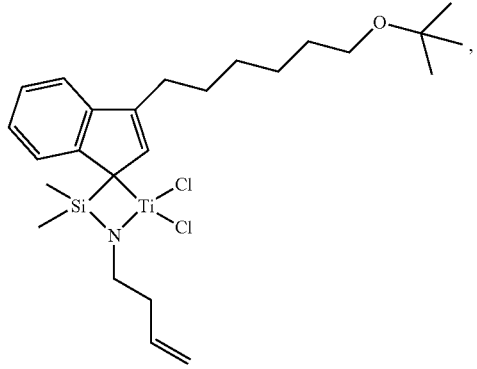

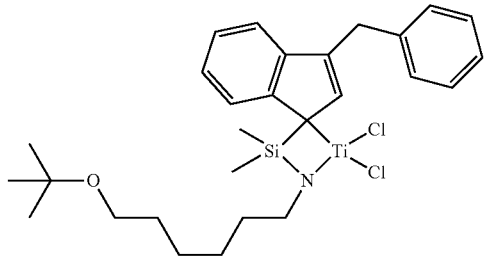

The metallocene catalyst used in the present invention may be those wherein at least one first metallocene compound represented by the Chemical Formula 1, and at least one second metallocene compound selected from the Chemical Formulae 3 to 5 are supported in a carrier together with a cocatalyst compound.

Further, the supported metallocene catalyst may induce the production of LCB (Long Chain Branch) in the prepared ethylene/1-hexene or ethylene/1-butene copolymer.

In the supported metallocene catalyst according to the present invention, as the cocatalyst that is supported together with a carrier so as to activate the metallocene compound, organic metal compounds including Group 13 metal may be used without specific limitations as long as it may be used when polymerizing olefin in the presence of a common metallocene catalyst.

Specifically, the cocatalyst compound may comprise at least one of an aluminum-containing first cocatalyst of the following Chemical Formula 6, and a borate-based second cocatalyst of the following Chemical Formula 7.

$$-[Al(R_{18})-O-]_k-$$ [Chemical Formula 6]

in the Chemical Formula 6, $R_{18}$'s are each independently halogen, or a $C_{1-20}$ hydrocarbyl group unsubstituted or substituted with halogen, and
k is an integer of 2 or more, $$T^+[BG_4]^-$$ [Chemical Formula 7]

in the Chemical Formula 7, $T^+$ is polyatomic ion having a valence of +1,

B is boron in +3 oxidation state, and

G's are each independently selected from the group consisting of hydride, dialkylamido, halide, alkoxide, aryloxide, hydrocarbyl, halocarbyl and halo-substituted hydrocarbyl, and G has 20 or less carbon, provided that G is halide in one or less position.

Due to the use of the first and second cocatalysts, the molecular weight distribution of the finally prepared polyolefin may become more uniform, and polymerization activity may be improved.

The first cocatalyst of the Chemical Formula 6 may be an alkyaluminoxane compound including repeat units bonded in a linear, circular or network shape, and specific examples thereof may include methylaluminoxane (MAO), ethylaluminoxane, isobutylaluminoxane, or butylaluminoxane, and the like.

Further, the second cocatalyst of the Chemical Formula 7 may be a borate-based compound in the form of trisubstituted ammonium salt, dialkyl ammonium salt, or trisubstituted phosphonium salt.

Specific examples of the second cocatalyst may include borate-based compounds in the form of tri-substituted ammonium salts, such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate and N,N-dimethyl-(2,4,6-trimethylanilinium)tetrakis-(2,3,4,6-tetrafluorophenyl)borate; borate-based compounds in the form of dialkyl ammonium salts, such as dioctadecylammonium tetrakis(pentafluorophenyl)borate, ditetradecylammonium tetrakis(pentafluorophenyl)borate and dicyclohexylammonium tetrakis(pentafluorophenyl)borate; and borate-based compounds such as tri-substituted phosphonium salts, such as triphenylphosphonium tetrakis(pentafluorophenyl) borate, methyldioctadecylphosphonium tetrakis(pentafluorophenyl)borate and tri(2,6-dimethylphenyl)phosphonium tetrakis(pentafluorophenyl)borate.

In the supported metallocene catalyst according to the present invention, the weight ratio of total transition metal included in the first metallocene compound represented by the Chemical Formula 1, or the second metallocene compound represented by the Chemical Formulae 3 to 5 to the carrier may be 1:10 to 1:1,000. When the carrier and the metallocene compound are included in the above weight ratio, the optimum shape may be exhibited. Further, the weight ratio of the cocatalyst compound to the carrier may be 1:1 to 1:100.

In the supported metallocene catalyst according to the present invention, as the carrier, those containing hydroxyl groups on the surface may be used, and preferably, dried and surface moisture-removed carriers having highly reactive hydroxyl groups and siloxane groups may be used.

For example, silica, silica-alumina and silica-magnesia and the like dried at high temperature may be used, and they may commonly contain oxide, carbonate, sulfate, and nitrate such as $Na_2O$, $K_2CO_3$, $BaSO_4$, and $Mg(NO_3)_2$, and the like.

The drying temperature of the carrier may be preferably 200 to 800° C., more preferably 300 to 600° C., and most preferably 300 to 400° C. If the drying temperature of the carrier is less than 200° C., due to excessive moisture, surface moisture may react with the cocatalyst, and if it is greater than 800° C., pores on the carrier surface may be combined to reduce the surface area, and a lot of hydroxyl groups may be lost on the surface and only siloxane groups may remain, thus decreasing the reaction sites with the cocatalyst, which is not preferable.

The amount of the hydroxyl groups on the carrier surface may be preferably 0.1 to 10 mmol/g, more preferably 0.5 to 5 mmol/g. The amount of the hydroxyl groups on the carrier surface may be controlled by the preparation method and conditions of carrier, or drying conditions, for example, temperature, time, vacuum or spray drying and the like.

If the amount of the hydroxyl groups are less than 0.1 mmol/g, the reaction sites with the cocatalyst may be little, and if it is greater than 10 mmol/g, there is a possibility of being derived from moisture other than hydroxyl groups on the carrier particle surface, which is not preferable.

Meanwhile, the ethylene/1-hexene or ethylene/1-butene copolymer according to the present invention may be prepared by polymerizing ethylene, and 1-hexene or 1-butene in the presence of the above explained supported metallocene catalyst.

The polymerization reaction may be progressed by copolymerizing ethylene and 1-hexene or 1-butene using one continuous slurry polymerization reactor, loop slurry reactor, gas phase reactor or solution reactor.

Further, the polymerization temperature may be about 25 to about 500° C., preferably about 25 to about 200° C., more preferably about 50 to about 150° C. Further, the polymerization pressure may be about 1 to about 100 Kgf/cm², preferably about 1 to about 50 Kgf/cm², more preferably about 5 to about 30 Kgf/cm².

The supported metallocene catalyst may be dissolved or diluted in aliphatic hydrocarbon solvents having a carbon number of 5 to 12, for example, pentane, hexane, heptanes, nonane, decane and isomers thereof, aromatic hydrocarbon solvents such as toluene, benzene, chlorine-substituted hydrocarbon solvents such as dichloromethane, chlorobenzene, and the like, and introduced. It is preferable that the solvent used is treated with a small amount of alkyl aluminum, thereby removing a small amount of water or air and the like, acting as a catalytic poison, and a cocatalyst may be further used.

The ethylene/1-hexene or ethylene/1-butene copolymer according to the present invention is prepared by copolymerizing ethylene and 1-hexene or 1-butene monomers, using the catalyst of Chemical Formulae 3 to 5 that mainly polymerize low molecular weight polymer chain, and the catalyst of the Chemical Formula 1 that mainly polymerizes high molecular weight polymer chain. Due to the interaction of the two or more kinds of catalysts, polymer generally having wide molecular weight distribution, and including higher content of polymer chains of which Log M is in the range of 5.5~6.0 may be obtained.

As the result, the ethylene/1-hexene or ethylene/1-butene copolymer may exhibit molecular weight distribution curves as shown in FIGS. 1 and 2, for example, and may exhibit excellent processibility due to wide molecular weight distribution, and excellent FNCT property due to the high content of polymer chains of which Log M is in the range of 5.5~6.0. Since the ethylene/1-hexene or ethylene/1-butene copolymer according to the present invention satisfies the above properties, it has excellent processibility and formability and excellent environmental stress crack resistance, and may be preferably applied for a high inner pressure heating pipe, a mining pipe or a large diameter pipe, and the like.

Advantageous Effects

The ethylene/1-hexene or ethylene/1-butene copolymer according to the present invention has high molecular weight and wide molecular weight distribution, and excellent stress crack resistance, and thus, may be applied for a high inner pressure heating pipe, a mining pipe or a large diameter pipe, and the like.

DESCRIPTION OF DRAWINGS

FIG. 1 shows the GPC curve of the polymers prepared in Comparative Examples and Examples of the present invention.

FIG. 2 shows the GPC curve of the polymers prepared in Comparative Examples and Examples of the present invention.

DETAILED DESCRIPTION OF THE EMBODIMENTS

Hereinafter, preferable examples are presented to aid in understanding of the invention. However, these examples are provided only to aid in understanding of the invention, and the scope of the invention is not limited thereto.

A First Metallocene Compound

Preparation Example 1

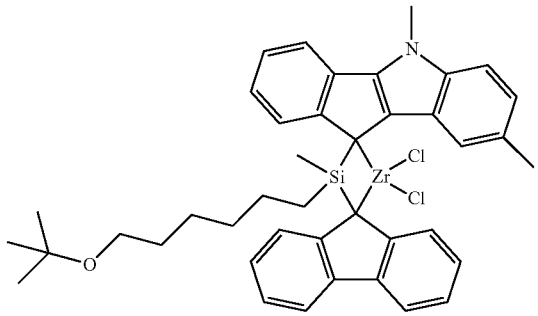

1-1) Preparation of a Ligand Compound 2 g of fluorene was dissolved in 5 mL MTBE, 100 mL hexane, and 5.5 mL of a 2.5 M n-BuLi solution in hexane was added dropwise thereto in a dry ice/acetone bath, and the solution was stirred at room temperature overnight. 3.6 g of (6-(tert-butoxy)hexyl)dichloro(methyl)silane was dissolved in 50 mL of hexane, and the fluorene-Li slurry was transferred thereto under a dry ice/acetone bath for 30 minutes, and the solution was stirred at room temperature overnight. Simultaneously, 5,8-dimethyl-5,10-dihydroindeno[1,2-b]indole (12 mmol, 2.8 g) was also dissolved in 60 mL of THF, and 5.5 mL of a 2.5 M n-BuLi solution in hexane was added dropwise thereto in a dry ice/acetone bath, and the solution was stirred at room temperature overnight. The reaction solution of fluorene and (6-(tert-butoxy)hexyl)dichloro(methyl)silane was NMR sampled to confirm the completion of the reaction, and then, the 5,8-dimethyl-5,10-dihydroindeno[1,2-b]indole-Li solution was transferred thereto under a dry ice/acetone bath. The solution was stirred at room temperature overnight. After the reaction, the solution was extracted with ether/water and remaining moisture of the organic layer was removed with $MgSO_4$ to obtain a ligand compound (Mw 597.90, 12 mmol), and it was confirmed by 1H-NMR that two isomers were produced.

$^1$H NMR (500 MHz, d6-benzene): −0.30~−0.18 (3H, d), 0.40 (2H, m), 0.65~1.45 (8H, m), 1.12 (9H, d), 2.36~2.40 (3H, d), 3.17 (2H, m), 3.41~3.43 (3H, d), 4.17~4.21 (1H, d), 4.34~4.38 (1H, d), 6.90~7.80 (15H, m)

1-2) Preparation of a Metallocene Compound 7.2 g (12 mmol) of the ligand compound synthesized in 1-1 was dissolved in 50 mL of diethylether, and 11.5 mL of a 2.5 M n-BuLi solution in hexane was added dropwise thereto in a dry ice/acetone bath, and the solution was stirred at room temperature overnight. The solution was vacuum dried to obtain brown sticky oil. It was dissolved in toluene to obtain a slurry. $ZrCl_4(THF)_2$ was prepared and 50 mL of toluene was added to prepare a slurry. The 50 mL toluene slurry of $ZrCl_4(THF)_2$ was transferred under a dry ice/acetone bath. After stirring at room temperature overnight, it turned to violet color. The reaction solution was filtered to remove LiCl. The filtrate was vacuum dried to remove toluene, and then, hexane was introduced and sonication was conducted for 1 hour. The slurry was filtered to obtain filtered solid of 6 g of dark violet metallocene compound (Mw 758.02, 7.92 mmol, yield 66 mol %). Two isomers were observed in 1H-NMR.

¹H NMR (500 MHz, CDCl₃): 1.19 (9H, d), 1.71 (3H, d), 1.50~1.70 (4H, m), 1.79 (2H, m), 1.98~2.19 (4H, m), 2.58 (3H, s), 3.38 (2H, m), 3.91 (3H, d), 6.66~7.88 (15H, m)

A Second Metallocene Compound

Preparation Example 2

Preparation of [tBu-O—(CH₂)₆—C₅H₄]₂ZrCl₂]

t-Butyl-O—(CH₂)₆—Cl was prepared using 6-chlorohexanol by the method suggested in the document (Tetrahedron Lett. 2951 (1988)), and NaCp was reacted therewith to obtain t-Butyl-O—(CH₂)₆—C₅H₅ (yield 60%, b.p. 80° C./0.1 mmHg).

Further, t-Butyl-O—(CH₂)₆—C₅H₅ was dissolved in THF at −78° C., n-BuLi was slowly added thereto, the temperature was raised to room temperature, and the solution was reacted for 8 hours. The synthesized lithium salt solution was slowly added to a suspension of ZrCl₄(THF)₂(1.70 g, 4.50 mmol)/THF(30 mL) at −78° C., and the solution was further reacted for 6 hours.

All volatile materials were vacuum dried, and a hexane solvent was added to the obtained oily liquid substance to filter. The filtered solution was vacuum dried, and then, hexane was added to induce precipitation at low temperature (−20° C.). The obtained precipitate was filtered at low temperature to obtain a white solid compound [tBu-O—(CH₂)₆—C₅H₄]₂ZrCl₂] (yield 92%).

¹H NMR (300 MHz, CDCl₃): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H)

¹³C NMR (CDCl₃): 135.09, 116.66, 112.28, 72.42, 61.52, 30.66, 30.61, 30.14, 29.18, 27.58, 26.00

Precipitation 3

Preparation of [(tBu-O—(CH₂)₆)(CH₃)Si(C₅(CH₃)₄)(tBu-N)TiCl₂]

50 g of Mg(s) was introduced into a 10 L reactor at room temperature, and then, THF 300 mL was added thereto. About 0.5 g of 12 was added, and then, the temperature of the reactor was maintained at 50° C. After the temperature of the reactor was stabilized, 250 g of 6-t-butoxyhexyl chloride was added to the reactor at a speed of 5 mL/min using a feeding pump. It was observed that as 6-t-butoxyhexyl chloride was added, the temperature of the reactor increased by about 4 to 5° C. While continuously adding 6-t-butoxyhexyl chloride, the solution was stirred for 12 hours. After reaction for 12 hours, a black reaction solution was obtained. 2 mL of the produced black solution was taken, water was added thereto to obtain an organic layer, and 6-t-butoxyhexane was confirmed through 1H-NMR. From the 6-t-butoxyhexane, it could be seen that a Gringanrd reaction progressed well. Thus, 6-t-butoxyhexyl magnesium chloride was synthesized.

500 g of MeSiCl₃ and 1 L of THF were added to a reactor, and the reactor was cooled to −20° C. 560 g of the synthesized 6-t-butoxyhexyl magnesium chloride was added to the reactor at a speed of 5 mL/min using a feeding pump. After the feeding of a Grignard reagent was completed, the solution was stirred for 12 hours while slowly raising the temperature of the reactor to room temperature. After reaction for 12 hours, it was confirmed that white MgCl₂ salts were produced. 4 L of hexane was added and salts were removed through Labdori to obtain a filtered solution. The filtered solution was added to the reactor, and then, hexane was removed at 70° C. to obtain light yellow liquid. It was confirmed through 1H-NMR that the obtained liquid is desired compound methyl(6-t-butoxyhexyl)dichlorosilane.

¹H-NMR (CDCl₃): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethylcyclopentadiene and 2.4 L of THF were added to the reactor, and then, the reactor was cooled to −20° C. 480 mL of n-BuLi was added to the reactor at a speed of 5 mL/min using a feeding pump. After n-BuLi was added, the solution was stirred for 12 hours while slowly raising the temperature of the reactor. After reaction for 12 hours, an equivalent of methyl(6-t-butoxyhexyl)dichlorosilane (326 g, 350 mL) was rapidly added to the reactor. The solution was stirred for 12 hours while slowly raising the temperature of the reactor to room temperature, and then, the reactor was cooled to 0° C. again, and 2 equivalents of t-BuNH₂ was added. While slowly raising the temperature of the reactor to room temperature, the solution was stirred for 12 hours. After reaction for 12 hours, THF was removed, 4 L of hexane was added, and salts were removed through Labdori to obtain a filtered solution. The filtered solution was added to the reactor again, and then, hexane was removed at 70° C. to obtain a yellow solution. It was confirmed through 1H-NMR that the obtained yellow solution is methyl(6-t-butoxyhexyl)(tetramethylCpH)t-butylaminosilane.

To the dilithium salt of ligand of −78° C. synthesized from n-BuLi and ligand dimethyl(tetramethylCpH)t-butylaminosilane in a THF solution, TiCl₃(THF)₃(10 mmol) was rapidly added. The reaction solution was stirred for 12 hours while slowly raising the temperature from −78° C. to room temperature. After stirring for 12 hours, an equivalent of PbCl₂(10 mmol) was added to the reaction solution at room temperature, and the solution was stirred for 12 hours. After stirring for 12 hours, a bluish black solution was obtained. THF was removed in the produced reaction solution, and then, hexane was added to filter the product. After removing hexane in the obtained filtered solution, it was confirmed through 1H-NMR that desired methyl(6-t-butoxyhexyl)silyl (η5-tetramethylCp)(t-butylamido)]TiCl₂ of tBu-O—(CH₂)₆)(CH₃)Si(C₅(CH₃)₄)(tBu-N)TiCl₂ was obtained.

¹H-NMR (CDCl₃): 3.3 (s, 4H), 2.2 (s, 6H), 2.1 (s, 6H), 1.8~0.8 (m), 1.4 (s, 9H), 1.2 (s, 9H), 0.7 (s, 3H)

Hybrid Supported Catalyst

Comparative Examples 1-1 and 1-2

Into a 20 L sus high pressure reactor, 5.0 kg of a toluene solution was introduced and the temperature of the reactor was maintained at 40° C. 1,000 g of silica dehydrated by adding vacuum at 600° C. for 12 hours (manufactured by Grace Davison Company, SYLOPOL 948) was introduced into the reactor, the silica was sufficiently dispersed, and then, 80 g of the metallocene compound of the Preparation Example 2 was dissolved in toluene and introduced, and the solution was stirred at 200 rpm for 2 hours and reacted. Thereafter, the stirring was discontinued, and the solution was settled for 30 minutes, and then, the reaction solution was decanted.

2.5 kg of toluene was introduced into the reactor, 9.4 kg of a 10 wt % methylaluminoxane (MAO)/toluene solution was introduced, and then, the solution was stirred at 40° C., 200 rpm for 12 hours. After the reaction, stirring was discontinued, and the solution was settled for 30 minutes, and then, the reaction solution was decanted. 3.0 kg of toluene was introduced, and the solution was stirred for 10 minutes, and then, stirring was discontinued, the solution was settled for 30 minutes, and the toluene solution was decanted.

3.0 kg of toluene was introduced into the reactor, 236 mL of 29.2 wt % metallocene compound of Preparation Example 3/toluene solution was introduced, and the solution was stirred at 40° C., 200 rpm for 2 hours and reacted. The temperature of the reactor was lowered to room temperature, and then, stirring was discontinued, the solution was settled for 30 minutes, and the reaction solution was decanted.

2.0 kg of toluene was introduced in the reactor, and the solution was stirred for 10 minutes, and then, stirring was discontinued, the solution was settled for 30 minutes, and the reaction solution was decanted.

3.0 kg of hexane was introduced into the reactor, the hexane slurry was transferred to a filter dryer, and the hexane solution was filtered. By drying at 40° C. for 4 hours under reduced pressure, 910 g-SiO$_2$ hybrid supported catalyst was prepared.

Examples 1-1 and 1-2

Supported catalysts were prepared by the same methods as Comparative Examples 1-1 and 1-2, except that 314 mL of the metallocene compound of Preparation Example 3/toluene solution was introduced.

Example 1-3

Into a 20 L sus high pressure reactor, 6.0 kg of a toluene solution was introduced and the temperature of the reactor was maintained at 40° C. 1,000 g of silica dehydrated by adding vacuum at 600° C. for 12 hours (manufactured by Grace Davison Company, SYLOPOL 948) was introduced into the reactor, the silica was sufficiently dispersed, and then, 80 g of the metallocene compound of the Preparation Example 2 was dissolved in toluene and introduced, and the solution was stirred at 40° C. for 2 hours and reacted. Thereafter, the stirring was discontinued, and the solution was settled for 30 minutes, and then, the reaction solution was decanted.

2.5 kg of toluene was introduced into the reactor, 9.4 kg of a 10 wt % methylaluminoxane (MAO)/toluene solution was introduced, and then, the solution was stirred at 40° C., 200 rpm for 12 hours. After the reaction, stirring was discontinued, and the solution was settled for 30 minutes, and then, the reaction solution was decanted. 3.0 kg of toluene was introduced, and the solution was stirred for 10 minutes, and then, stirring was discontinued, the solution was settled for 30 minutes, and the toluene solution was decanted.

3.0 kg of toluene was introduced into the reactor, 314 mL of the 29.2 wt % metallocene compound of Preparation Example 3/toluene solution was introduced, and the solution was stirred at 40° C., 200 rpm for 2 hours and reacted.

80 g of the metallocene compound of Preparation Example 1 and 1,000 mL of toluene were put in a flask to prepare a solution, and sonication was conducted for 30 minutes. The prepared metallocene compound of Preparation Example 1/toluene solution was introduced into the reactor, and the solution was stirred at 40° C., 200 rpm for 2 hours and reacted. The temperature of the reactor was lowered to room temperature, and then, stirring was discontinued, the solution was settled for 30 minutes, and the reaction solution was decanted.

2.0 kg of toluene was introduced in the reactor, and the solution was stirred for 10 minutes, and then, stirring was discontinued, the solution was settled for 30 minutes, and the reaction solution was decanted.

3.0 kg of hexane was introduced into the reactor, the hexane slurry was transferred to a filter dryer, and the hexane solution was filtered. By drying at 40° C. for 4 hours under reduced pressure, 890 g-SiO$_2$ hybrid supported catalyst was prepared.

Comparative Example 2-1

Into a 20 L sus high pressure reactor, 3.0 kg of a toluene solution was introduced and the temperature of the reactor was maintained at 40° C. 500 g of silica (Grace Davison, SP2212) was introduced into the reactor, the silica was sufficiently dispersed, and then, 3.00 kg of a 10 wt % methylaluminoxane (MAO)/toluene solution was introduced, the temperature was raised to 80° C., and the solution was stirred at 200 rpm for 15 hours or more. The temperature of the reactor was lowered to 40° C. again, and then, 144 g of 7.5 wt % catalyst of Preparation Example 2/toluene solution was introduced into the reactor, and the solution was stirred at 200 rpm for 1 hour. 240 g of 8.8 wt % catalyst of Preparation Example 1/toluene solution was introduced into the reactor, and the solution was stirred at 200 rpm for 1 hour. The catalyst of Preparation Example 3 (18 g) was dissolved in toluene and introduced into the reactor, and the solution was stirred at 200 rpm for 2 hours. 70 g of a cocatalyst(anilinium tetrakis(pentafluorophenyl)borate) was diluted in toluene and introduced into the reactor, and the solution was stirred at 200 rpm for 15 hours or more. The temperature of the reactor was lowered to room temperature, and then, the stirring was discontinued, the solution was settled for 30 minutes, and the reaction solution was decanted. The toluene slurry was transferred to a filter dryer and filtered. 3.0 kg of toluene was introduced and the solution was stirred for 10 minutes, and then, stirring was discontinued and the solution was filtered. 3.0 kg of hexane was introduced into the reactor, and the solution was stirred for 10 minutes, and then, stirring was discontinued and the solution was filtered. By drying at 50° C. for 4 hours under reduced pressure, a 500 g-SiO$_2$ supported catalyst was prepared.

Examples 2-1 to 2-3

Into a 20 L sus high pressure reactor, 3.0 kg of a toluene solution was introduced and the temperature of the reactor was maintained at 40° C. 500 g of silica (Grace Davison, SP2212) was introduced into the reactor, the silica was sufficiently dispersed, and then, 2.78 kg of 10 wt % methylaluminoxane (MAO)/toluene solution was introduced, the temperature was raised to 80° C., and the solution was stirred at 200 rpm for 15 hours. The temperature of the reactor was lowered to 40° C. again, and then, 300 g of 7.5 wt % catalyst of Preparation Example 2/toluene solution was introduced into the reactor, and the solution was stirred at 200 rpm for 1 hour. 250 g of 8.8 wt % catalyst of Preparation Example 1/toluene solution was introduced into the reactor, and the solution was stirred at 200 rpm for 1 hour. The catalyst of Preparation Example 3 (20 g) was dissolved in toluene and introduced into the reactor, and the solution was stirred at 200 rpm for 2 hours. 70 g of a cocatalyst(anilinium tetrakis(pentafluorophenyl)borate) was diluted in toluene and introduced into the reactor, and the solution was stirred at 200 rpm for 15 hours or more. The temperature of the reactor was lowered to room temperature, and then, the stirring was discontinued, the solution was settled for 30 minutes, and the reaction solution was decanted. The toluene slurry was transferred to a filter dryer and filtered. 3.0 kg of toluene was introduced and the solution was stirred for 10 minutes, and then, stirring was discontinued and the solution was filtered. 3.0 kg of hexane was introduced into the reactor, and the solution was stirred for 10 minutes, and then, stirring was discontinued and the solution was filtered. By drying at 50° C. for 4 hours under reduced pressure, a 500 g-$SiO_2$ supported catalyst was prepared.

Ethylene/1-hexene copolymer

Each hybrid supported metallocene catalyst prepared in Examples 1-1 to 1-3 and Comparative Examples 1-1 and 1-2 was introduced into an isobutene slurry loop process continuous polymerization reactor (reactor volume 140 L, reactant flow rate 7 m/s) to prepare olefin polymer. As comonomer, 1-hexene was used, and the reaction pressure was maintained at 40 bar and the polymerization temperature was maintained at 90° C.

The polymerization conditions using each hybrid supported metallocene catalyst of Examples 1-1 to 1-3 and Comparative Examples 1-1 and 1-2 are summarized in the following Table 1.

TABLE 1

| Catalyst used | Comparative Example 1-1 | Comparative Example 1-2 | Example 1-1 | Example 1-2 | Example 1-3 |
|---|---|---|---|---|---|
| Ethylene supply amount (kg/hr) | 29.7 | 30.0 | 31.2 | 31.1 | 33.0 |
| 1-hexene input (wt %) | 2.1 | 2.2 | 2.5 | 2.5 | 2.9 |
| Hydrogen input (ppm) | 53 | 53 | 55 | 56 | 177 |
| Catalytic activity (kgPE/kg cat./hr) | 3.9 | 3.8 | 3.9 | 4.0 | 3.9 |

Ethylene/1-butene copolymer

With each hybrid supported metallocene catalyst prepared in Examples 2-1 to 2-3 and Comparative Example 2-1, two hexane slurry stirred tank process polymerization reactors were bimodally operated to prepare olefin polymer. As comonomer, 1-butene was used.

The polymerization conditions using each hybrid supported metallocene catalyst of Examples 2-1 to 2-3 and Comparative Example 2-1 are summarized in the following Table 2.

TABLE 2

| Catalyst used | Comparative Example 2-1 | Example 2-1 | Example 2-2 | Example 2-3 |
|---|---|---|---|---|
| R1 ethylene supply amount (kg/hr) | 7.0 | 7.0 | 7.0 | 7.0 |
| R1 pressure (kg/cm²) | 7.1 | 7.5 | 7.2 | 7.9 |
| R1 temperature (° C.) | 83.0 | 84.4 | 85.0 | 84.0 |
| R1 hydrogen input (g/hr) | 3.00 | 3.10 | 2.44 | 1.70 |
| R2 ethylene supply amount (kg/hr) | 6.0 | 6.0 | 6.0 | 6.0 |
| R2 pressure (kg/cm²) | 4.9 | 4.7 | 4.8 | 4.8 |
| R2 temperature (° C.) | 75.1 | 75.2 | 73.0 | 75.0 |
| R2 1-butene input (g/hr) | 20.0 | 18.0 | 18.0 | 18.0 |
| Catalytic activity (kg PE/g $SiO_2$) | 2.6 | 6.1 | 7.8 | 6.4 |

Assessment of Properties of Polymer

The properties of the polymers prepared in Examples and Comparative Examples were assessed by the following method.

1) density: ASTM 1505
2) melt flow rate (MFR, 2.16 kg/21.6 kg): measurement temperature 190° C., ASTM 1238
3) MFRR ($MFR_{21.6}$/$MFR_{2.16}$): the ratio of $MFR_{21.6}$ melt index (MI, 21.6 kg load) divided by $MFR_{2.16}$ (MI, 2.16 kg load).
4) Mn, Mw, PDI, GPC curves: The sample was pretreated by dissolving in 1,2,4-trichlorobenzene containing 0.0125% BHT using PL-SP260 at 160° C. for 10 hours, and number average molecular weight and weight average molecular weight were measured at measurement temperature of 160° C. using PL-GPC220. The molecular weight distribution was expressed as the ratio of weight average molecular weight and number average molecular weight.
5) FNCT (Full Notch Creep Test): measured according to ISO 16770, as conducted until now and described in a document [M. Fleissner in Kunststoffe 77 (1987), pp. 45 et seq.]. At 10% concentration of IGEPAL CO-630 (Etoxilated Nonylphenol, Branched), a stress crack accelerating medium using tension of 4.0 MPa at 80° C., due to the shortening of stress initiation time by notch (1.5 mm/safety razor blade), damage time was shortened. The test specimens were manufactured by sawing three test specimens of width 10 mm, height 10 mm, length 100 mm from compression-moulded sheet of 10 mm thickness. In a notch device specifically prepared for this purpose, a center notch was provided to the sample using safety razor blade. The notch depth is 1.5 mm. The time taken until the specimen was cut was measured.

The results are shown in the following Tables 3 and 4. Further, the GPC curves of each polymer are shown in FIGS. 1 and 2.

TABLE 3

| | Unit | Comparative Example 1-1 | Comparative Example 1-2 | Example 1-1 | Example 1-2 | Example 1-3 |
|---|---|---|---|---|---|---|
| Density | g/cm³ | 0.941 | 0.941 | 0.941 | 0.941 | 0.941 |
| $MFR_{2.16}$ | g/10 min | 0.63 | 0.56 | 0.55 | 0.56 | 0.41 |
| HLMI | — | 20.7 | 18.9 | 17.4 | 18.2 | 49.1 |
| $MFRR_{21.6/2.16}$ | — | 33 | 34 | 32 | 33 | 120 |
| Mn | — | 40,000 | 36,300 | 36,100 | 31,600 | 14,200 |
| Mw | — | 150,000 | 137,000 | 145,000 | 132,000 | 128,000 |
| MWD | — | 3.74 | 3.77 | 4.02 | 4.18 | 9.05 |

TABLE 3-continued

| | Unit | Comparative Example 1-1 | Comparative Example 1-2 | Example 1-1 | Example 1-2 | Example 1-3 |
|---|---|---|---|---|---|---|
| FNCT | hr | 300 | 400 | 2,000 | 2,000 | 3,000 |
| GPC curve | | | | FIG. 1 | | |

TABLE 4

| | Unit | Comparative Example 2-1 | Example 2-1 | Example 2-2 | Example 2-3 |
|---|---|---|---|---|---|
| Density | g/cm³ | 0.9432 | 0.9448 | 0.9457 | 0.9443 |
| MFR$_5$ | g/10 min | 0.31 | 0.23 | 0.17 | 0.24 |
| HLMI | — | 10.1 | 7.5 | 5.3 | 7.1 |
| MFRR$_{21.6/5}$ | — | 33 | 33 | 31 | 29 |
| Mn | — | 12,500 | 11,100 | 12,800 | 11,600 |
| Mw | — | 219,000 | 239,000 | 245,000 | 242,000 |
| MWD | — | 17.52 | 21.54 | 19.18 | 20.85 |
| FNCT | hr | 380 | 3,000 | 650 | 2,000 |
| GPC curve | | | FIG. 2 | | |

First, it was confirmed that the contents of polymer parts (log M=5~6) of Examples increased compared to each Comparative Example, as shown in FIG. 1 and FIG. 2. Particularly, it was confirmed that in case GPC curves are similar, even slight change in the contents of polymer parts (log M=5~6) has large influence on FNCT (Table 3 and Table 4).

The invention claimed is:

1. An ethylene/1-butene copolymer having:
weight average molecular weight(g/mol) of 10,000 to 400,000,
molecular weight distribution (Mw/Mn, PDI) of 2 to 30,
density (g/cm³) of 0.930 to 0.950,
MFR$_5$(g/10 min, measured at 190° C. by ASTM 1238) of 0.1 to 5,
melt flow rate ratio (MFR$_{21.6}$/MFR$_5$, measured at 190° C. by ASTM 1238) of 10 to 200, and an environmental stress crack resistance (ESCR) of 400 hours to 20,000 hours, as measure by full notch creep test (FNCT) according to ISO 16770 at 4.0 MPa and 80° C.

2. The copolymer according to claim 1,
wherein the environmental stress crack resistance (ESCR) measured by full notch creep test (FNCT) according to ISO 16770 at 4.0 MPa and 80° C. is 600 hours to 8,760 hours.

3. The copolymer according to claim 1,
wherein the weight average molecular weight is 50,000 to 350,000 g/mol.

4. The copolymer according to claim 1,
wherein the molecular weight distribution is 7 to 28.

5. The copolymer according to claim 1,
wherein the MFR$_5$ is 0.1 to 3.

6. The copolymer according to claim 1,
wherein the melt flow rate ratio is 15 to 180.

7. The copolymer according to claim 1,
wherein the ethylene/1-butene copolymer is prepared by polymerizing ethylene and 1 butene, in the presence of at least one first metallocene compound represented by the following Chemical Formula 1; and at least one second metallocene compound selected from the compounds represented by the following Chemical Formulae 3 to 5:

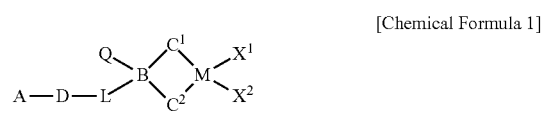

[Chemical Formula 1]

in the Chemical Formula 1,
A is hydrogen, halogen, C$_{1-20}$ alkyl, C$_{2-20}$ alkenyl, C$_{6-20}$ aryl, C$_{7-20}$ alkylaryl, C$_{7-20}$ arylalkyl, C$_{1-20}$ alkoxy, C$_{2-20}$ alkoxyalkyl, C$_{3-20}$ heterocycloalkyl, or C$_{5-20}$ heteroaryl;
D is —O—, —S—, —N(R)—or —Si(R)(R')—, wherein R and R' are identical to or different from each other, and are each independently hydrogen, halogen, C$_{1-20}$ alkyl, C$_{2-20}$ alkenyl, or C$_{6-20}$ aryl;
L is C$_{1-10}$ linear or branched alkylene;
B is carbon, silicon or germanium;
Q is hydrogen, halogen, C$_{1-20}$ alkyl, C$_{2-20}$ alkenyl, C$_{6-20}$ aryl, C$_{7-20}$ alkylaryl, or C$_{7-20}$ arylalkyl;
M is Group 4 transition metal;
X$^1$ and X$^2$ are identical to or different from each other, and are each independently halogen, C$_{1-20}$ alkyl, C$_{2-20}$ alkenyl, C$_{6-20}$ aryl, nitro, amido, C$_{1-20}$ alkylsilyl, C$_{1-20}$ alkoxy, C$_{1-20}$ , or C$_{1-20}$ sulfonate;
C$^1$ and C$^2$ are identical to or different from each other, and are each independently represented by one of the following Chemical Formula 2a, Chemical Formula 2b or Chemical Formula 2c, provided that both C$^1$ and C$^2$ are not Chemical Formula 2c;

[Chemical Formula 2a]

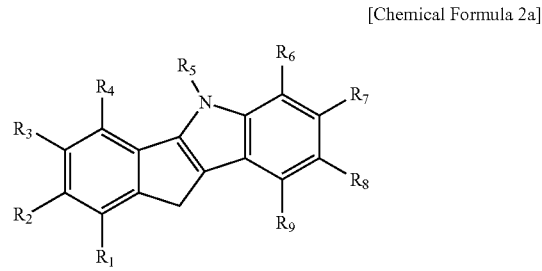

[Chemical Formula 2a]

-continued

[Chemical Formula 2b]

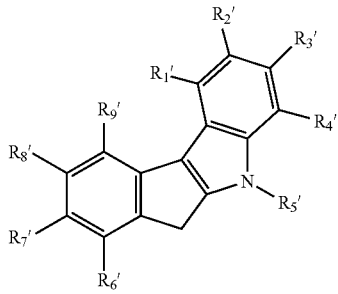

[Chemical Formula 2c]

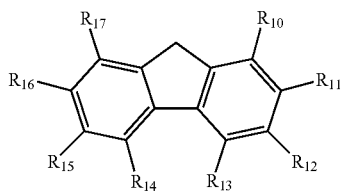

in the Chemical Formulae 2a, 2b and 2c, $R_1$ to $R_{17}$ and $R_1'$ to $R_9'$ are identical to or different from each other, and are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ alkoxy, $C_{6-20}$ aryl, $C_{7-20}$ alkylaryl, or $C_{7-20}$ arylalkyl, and two or more neighboring groups of $R_{10}$ to $R_{17}$ may be connected to each other to form a substituted or unsubstituted aliphatic or aromatic ring;

$$(Cp^1R^a)_n(Cp^2R^b)M^1Z^1_{3-n} \quad \text{[Chemical Formula 3]}$$

in the Chemical Formula 3, $M^1$ is Group 4 transition metal;

$Cp^1$ and $Cp^2$ are identical to or different from each other, and are each independently one selected from the group consisting of cyclopentadienyl, indenyl, 4,5,6,7-tetrahydro-1-indenyl, and fluorenyl radicals, which may be substituted with hydrocarbon having a carbon number of 1 to 20;

$R^a$ and $R^b$ are identical to or different from each other, and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^1$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, or substituted or unsubstituted amino, $C_{2-20}$ alkylalkoxy, or $C_{7-40}$ arylalkoxy;

n is 1 or 0;

$$(Cp^3R^c)_mB^1(Cp^4R^d)M^2Z^2_{3-m} \quad \text{[Chemical Formula 4]}$$

in the Chemical Formula 4, $M^2$ is Group 4 transition metal;

$Cp^3$ and $Cp^4$ are identical to or different from each other, and are each independently one selected from the group consisting of cyclopentadienyl, indenyl, 4,5,6,7-tetrahydro-1-indenyl and fluorenyl radicals, which may be substituted with hydrocarbon having a carbon number of 1 to 20;

$R^c$ and $R^d$ are identical to or different from each other, and are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^2$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, or substituted or unsubstituted amino, $C_{2-20}$ alkylalkoxy, or $C_{7-40}$ arylalkoxy;

$B^1$ is one or more of carbon, germanium, silicon, phosphorus or nitrogen-containing radical, or a combination thereof, which crosslinks a $Cp^3R^c$ ring with a $Cp^4R^d$ ring, or crosslinks one $Cp^4R^d$ ring to $M^2$;

m is 1 or 0;

$$(Cp^5R^e)B^2(J)M^3Z^3_2 \quad \text{[Chemical Formula 5]}$$

in the Chemical Formula 5, $M^3$ is Group 4 transition metal;

$Cp^5$ is one selected from the group consisting of cyclopentadienyl, indenyl, 4,5,6,7-tetrahydro-1-indenyl and fluorenyl radicals, which may be substituted with hydrocarbon having a carbon number of 1 to 20;

$R^e$ is hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl;

$Z^3$ is a halogen atom, $C_{1-20}$ alkyl, $C_{2-10}$ alkenyl, $C_{7-40}$ alkylaryl, $C_{7-40}$ arylalkyl, $C_{6-20}$ aryl, substituted or unsubstituted $C_{1-20}$ alkylidene, substituted or unsubstituted amino, $C_{2-20}$ alkylalkoxy, or $C_{7-40}$ arylalkoxy;

$B^2$ is one or more of carbon, germanium, silicon, phosphorus or nitrogen-containing radicals or a combination thereof, which crosslinks a $Cp^5R^e$ ring with J; and J is one selected from the group consisting of $NR^f$, O, $PR^f$ and S, wherein $R^f$ is $C_{1-20}$ alkyl, aryl, substituted alkyl, or substituted aryl.

* * * * *